United States Patent

Tatematsu et al.

[15] 3,700,818

[45] Oct. 24, 1972

[54] AUTOMATIC ANSWERING TELEPHONE SET

[72] Inventors: Kenzo Tatematsu, Amagasaki-shi; Hiroo Hosono, Osaka; Toshio Katagiri, Neyagawa-shi; Yoshiaki Hayashi, Toyonaka-shi; Hiroyuki Ando, Osaka, all of Japan

[73] Assignee: Matsushita Electric Industrial Co. Ltd., Osaka, Japan

[22] Filed: Sept. 14, 1970

[21] Appl. No.: 71,876

[30] Foreign Application Priority Data

| | | |
|---|---|---|
| Aug. 4, 1970 | Japan | 45/68571 |
| Sept. 20, 1969 | Japan | 44/89787 |
| Sept. 20, 1969 | Japan | 44/89816 |
| Sept. 20, 1969 | Japan | 44/90295 |
| Sept. 22, 1969 | Japan | 44/92588 |
| Nov. 12, 1969 | Japan | 44/107985 |
| Dec. 29, 1969 | Japan | 44/358 |
| Aug. 4, 1970 | Japan | 45/77977 |
| Aug. 12, 1970 | Japan | 45/80825 |

[52] U.S. Cl. ....... 179/6 R

[51] Int. Cl. ....... H04m 1/64

[58] Field of Search ....... 179/6 R, 6 AC, 6 C

[56] References Cited

UNITED STATES PATENTS

| | | | |
|---|---|---|---|
| 3,310,629 | 3/1967 | Yamamoto | 179/6 R |
| 3,590,159 | 6/1971 | Wolf | 179/6 R |
| 3,569,630 | 3/1971 | Parks et al. | 179/6 R |
| 3,250,856 | 5/1966 | Muller | 179/6 R |

FOREIGN PATENTS OR APPLICATIONS

| | | | |
|---|---|---|---|
| 1,268,620 | 6/1961 | France | 179/6 R |

*Primary Examiner*—Howard W. Britton
*Assistant Examiner*—Raymond F. Cardillo
*Attorney*—Stevens, Davis, Miller & Mosher

[57] ABSTRACT

In an automatic answering telephone set which is arranged to operate after receiving a call through an office line, then to send a preliminarily recorded message on a magnetic tape as an answer to the caller, and after sending, to record a message from the caller with a spiral track on a wide endless magnetic tape, the structure is improved as any one of the messages from the callers may be readily selected and reproduced by an operator and other operations are also simplified.

25 Claims, 44 Drawing Figures

K. TATEMATSU,
H. HOSONO, T. KATAGA
Y. HAYASHI AND
H. ANDO
INVENTORS

BY Stevens, Davis, Miller & Mosher
ATTORNEYS

Figure 35A:
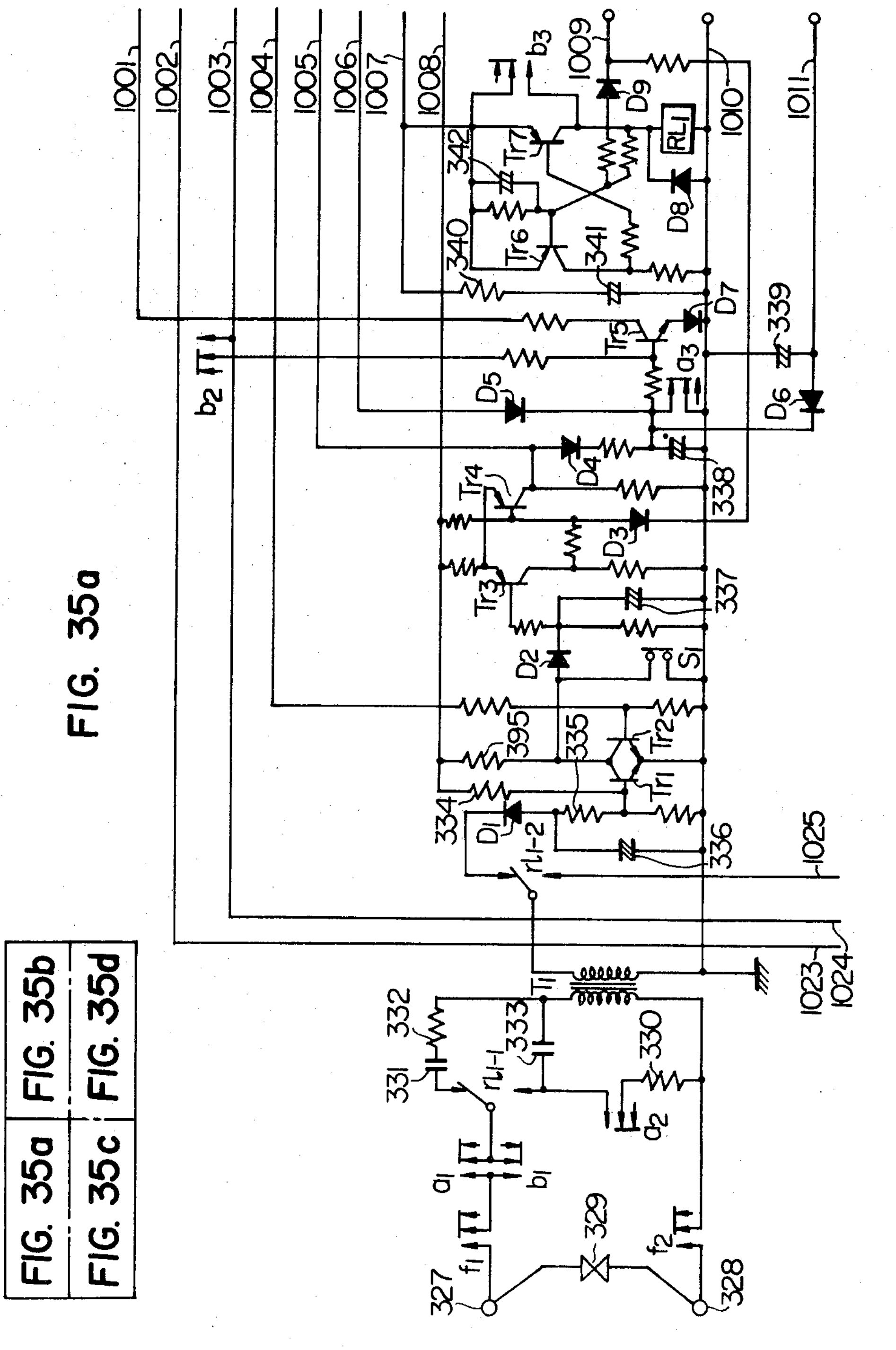
Figure 35B:
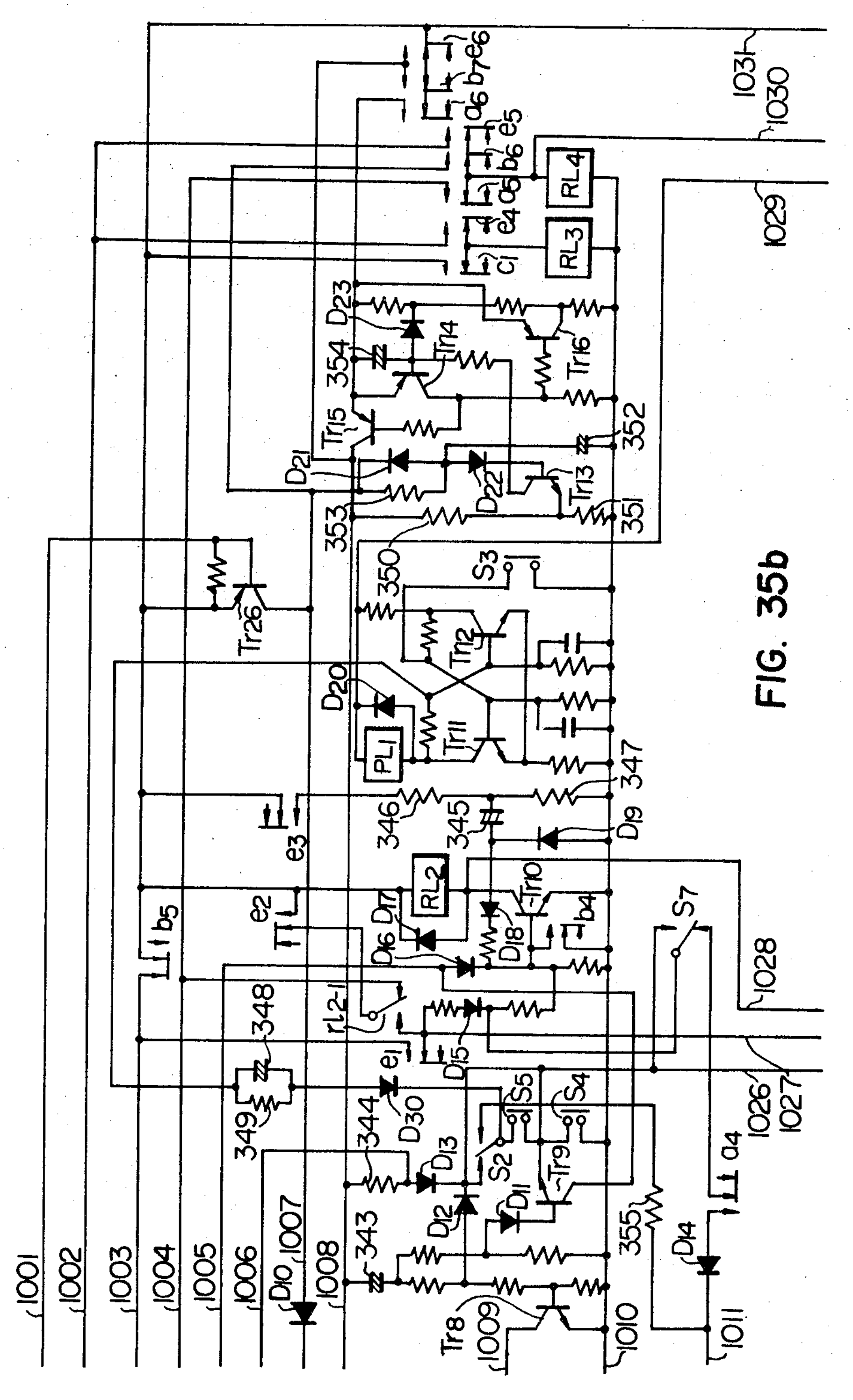
Figure 35C:
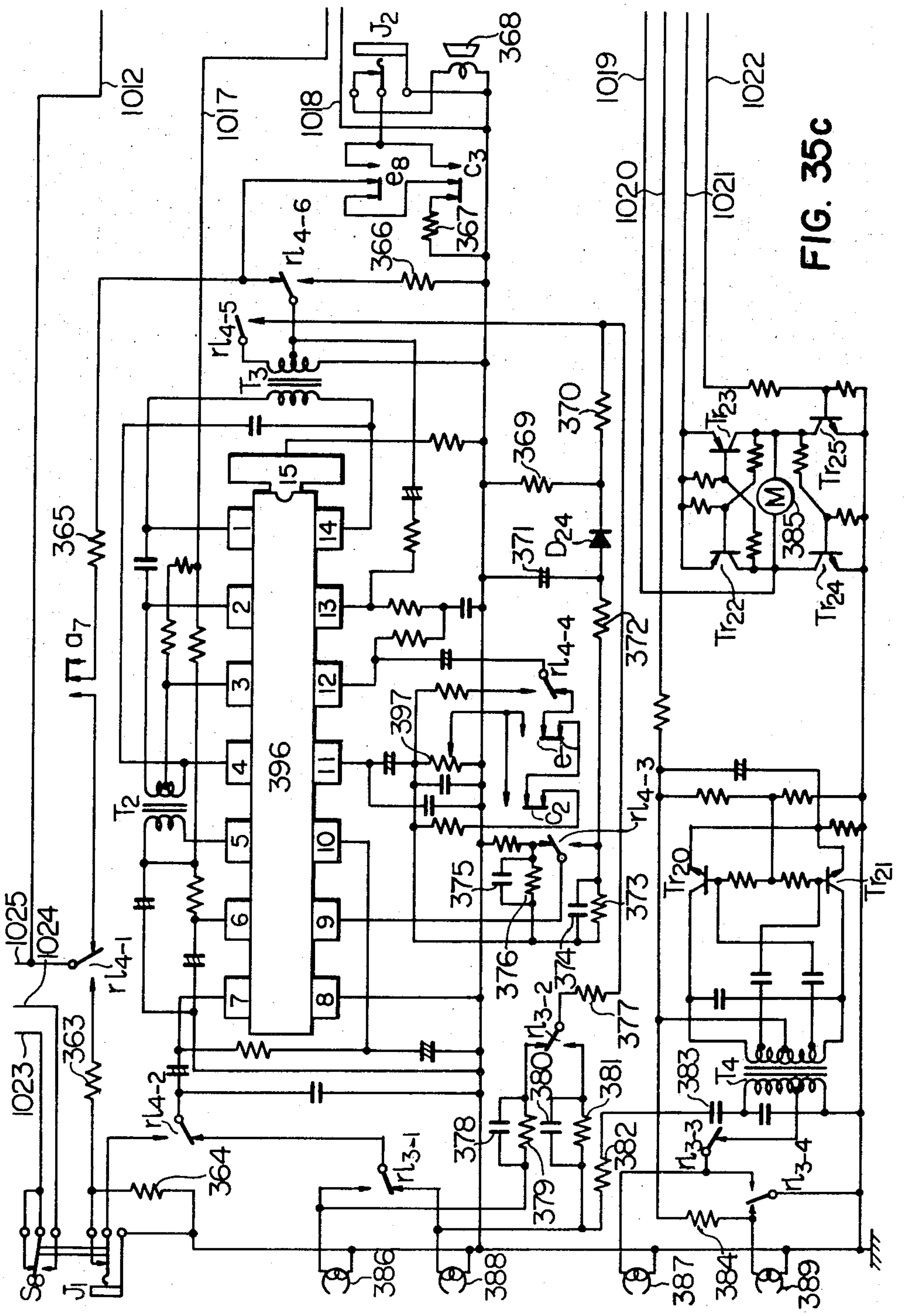
Figure 35D:
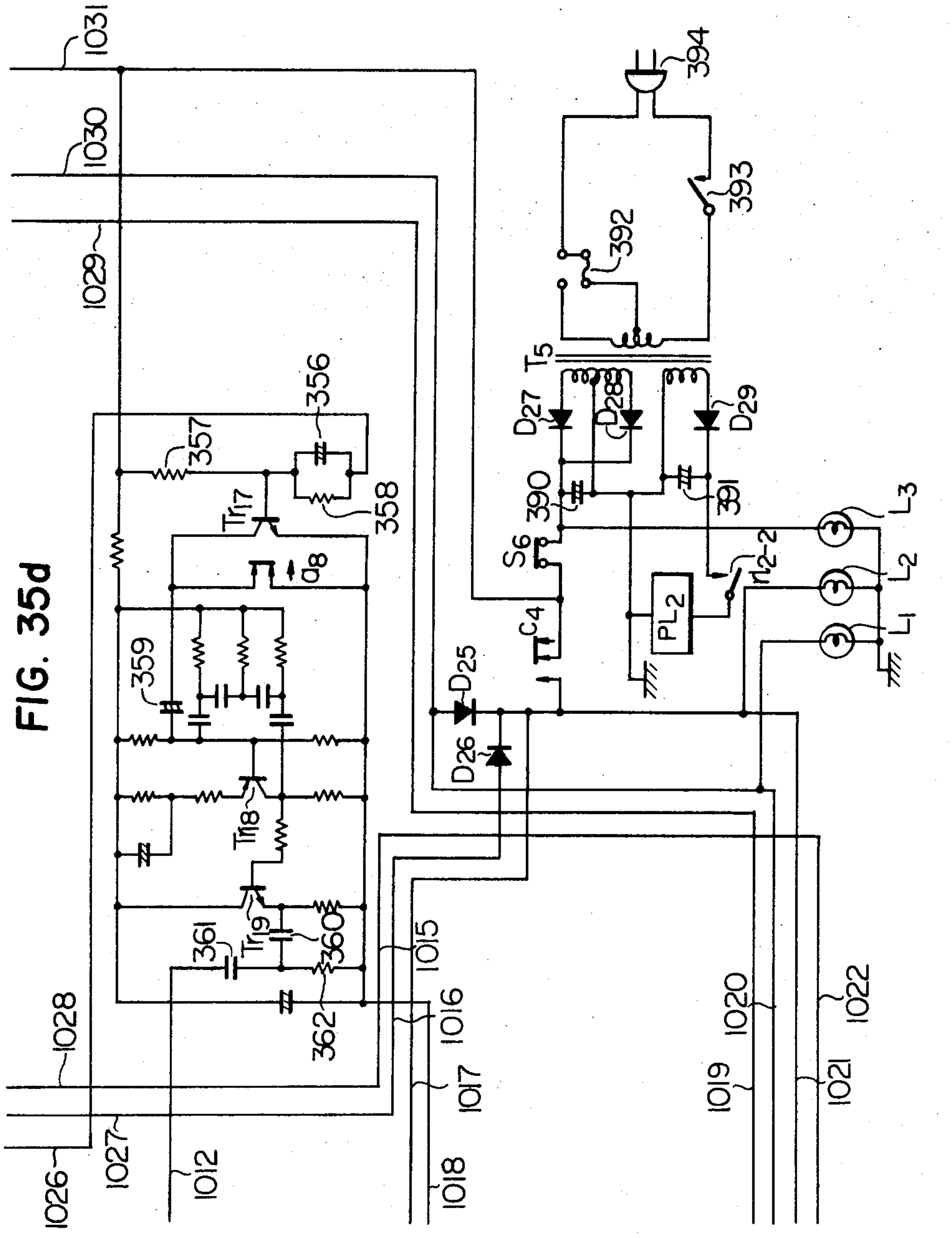

| | |
|---|---|
| FIG. 35a | FIG. 35b |
| FIG. 35c | FIG. 35d |

AUTOMATIC ANSWERING TELEPHONE SET

This invention relates to an automatic answering telephone set including a unit for recording and reproducing an answering message for sending information preliminarily prepared by the owner to a caller and a unit for recording and reproducing the caller's message. More particularly, the answering message is recorded on an endless tape one-fourth inch wide and the caller's message is recorded on another endless tape 3 inches wide. In operation, either the tape for the answering message or the tape for the caller's message is selectively driven by one of two coaxial capstans according to the purpose of the operation.

An object of the invention is to provide an automatic answering and recording device for a telephone set in which any one of the caller's messages can be readily selected and reproduced.

Another object of the invention is to provide an automatic answering telephone set which is protected from a malfunction in any operation.

According to the present invention, three different answering messages are recorded on the tape so that any message can be readily selected according to the purpose and one of them is particularly adapted to be used for merely sending the answering message without recording the caller's message, or in case of a long absence.

Among the features of the invention is the provision of a means for protecting the recording tape from being reproduced along a wrong track.

Other features of the invention reside in the tape driving mechanism to record the answering and caller's messages and the timer mechanism to limit the time to be used for recording the caller's message.

Figure 1:
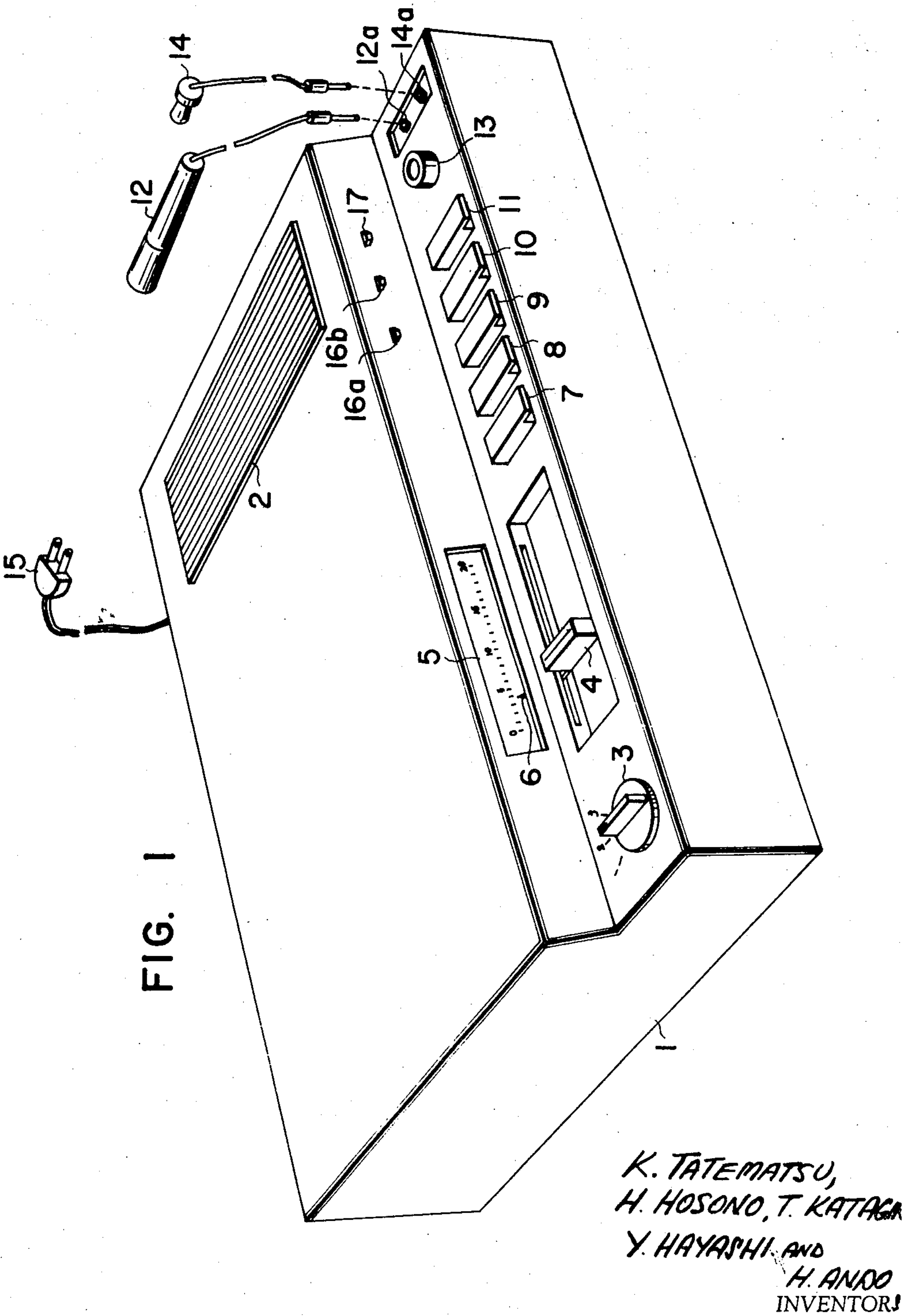
Figure 2:
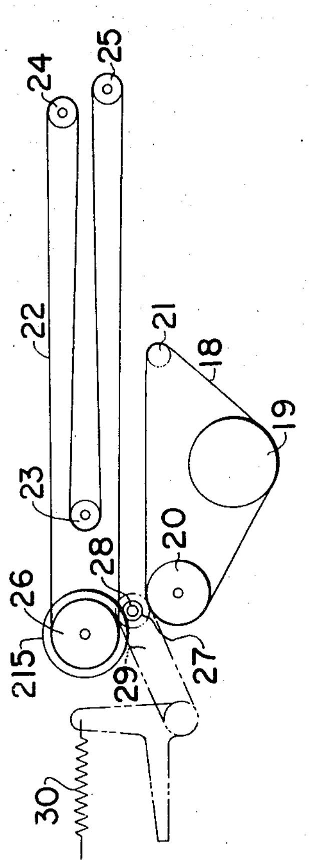
Figure 4:
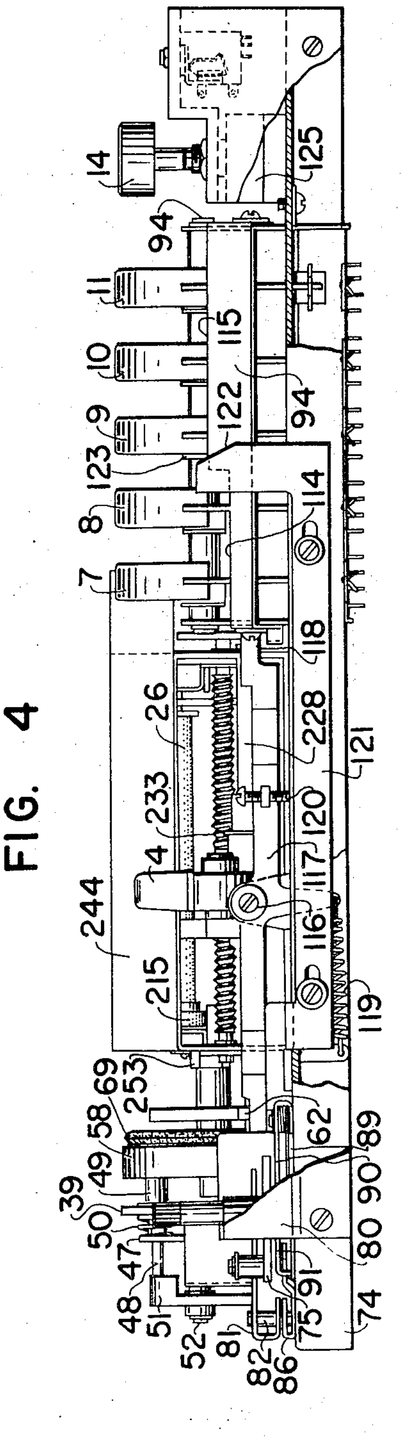
Figure 3:
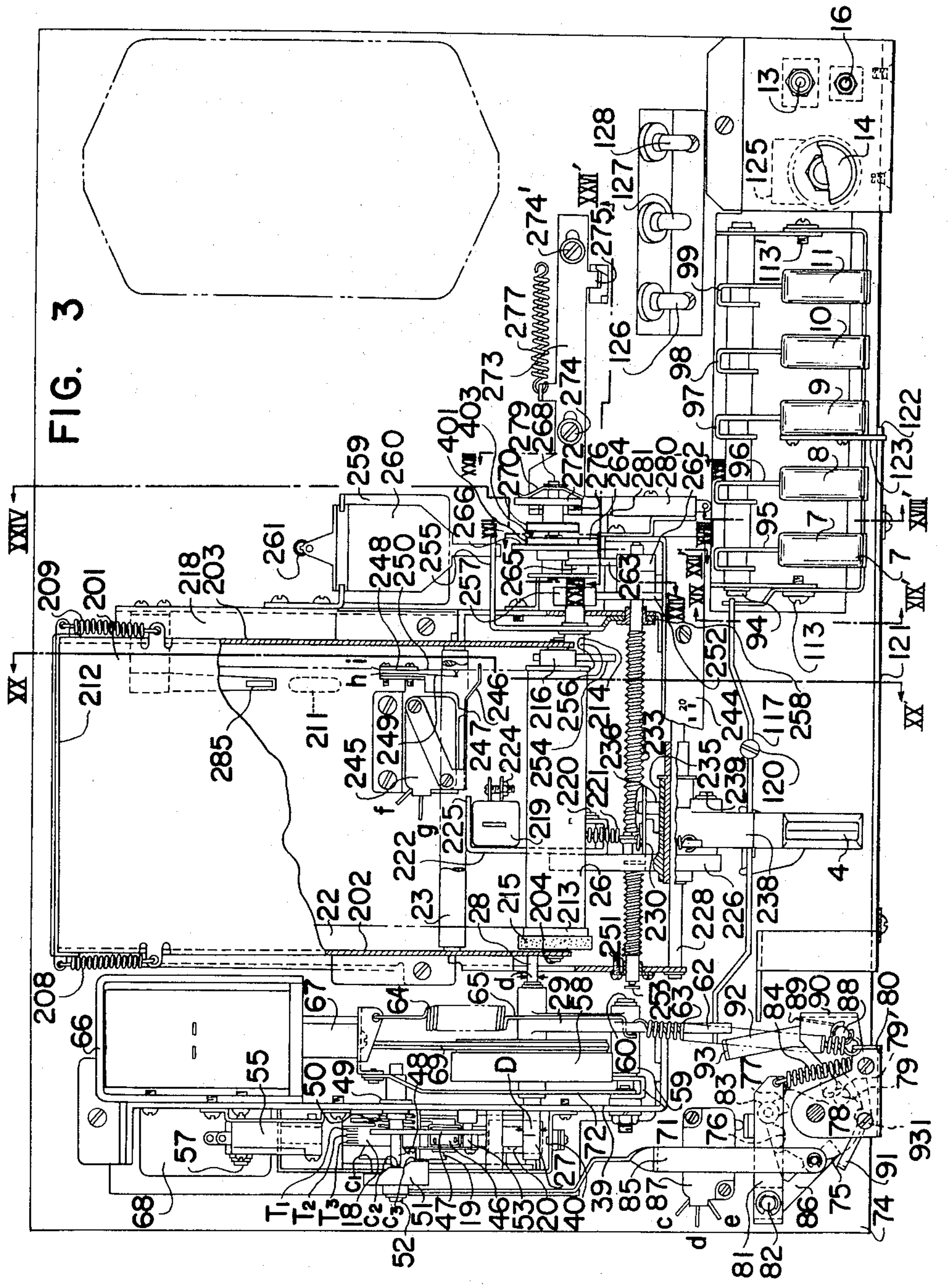
Figure 5:
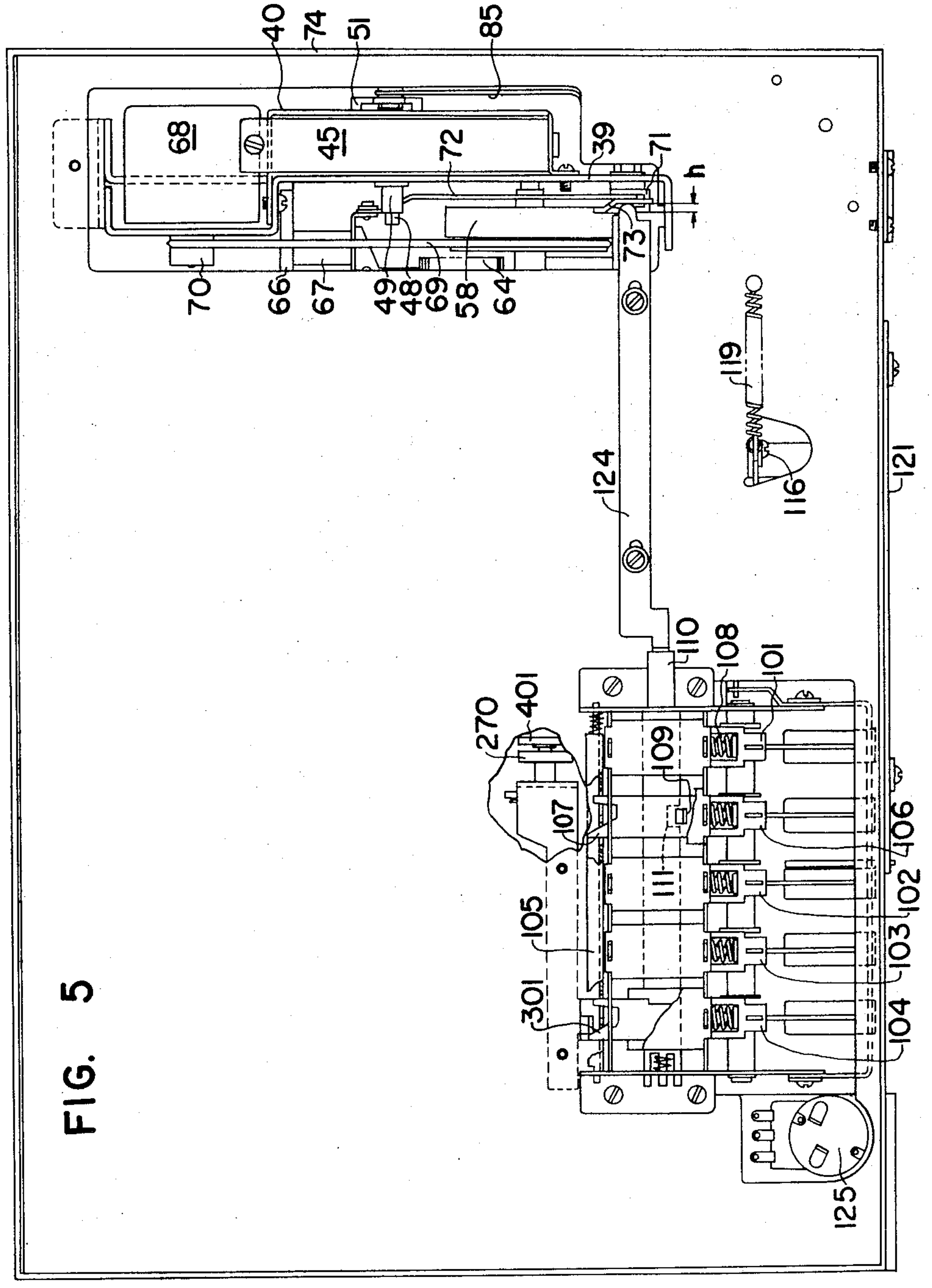
Figure 6:
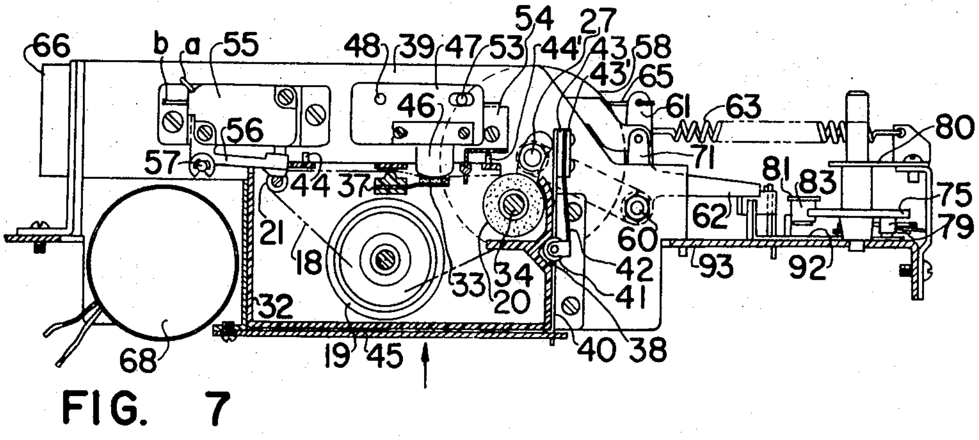
Figure 7:
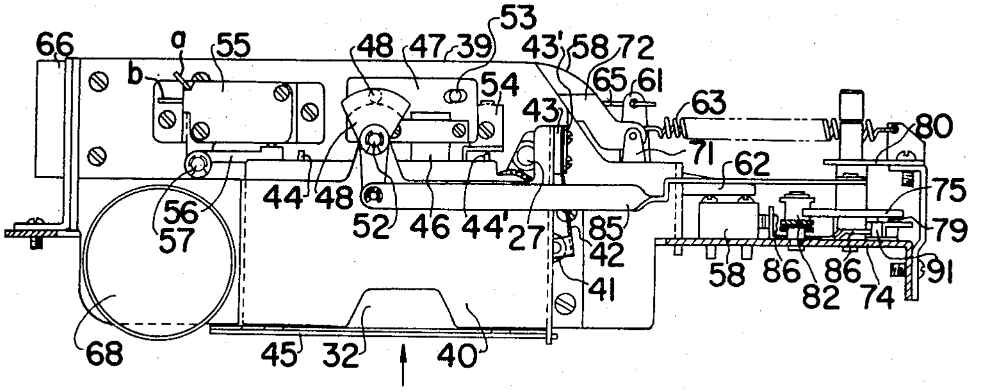
Figure 8:
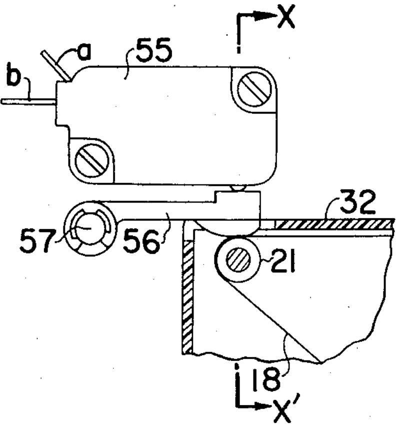
Figures 9, 10, 11, 12:
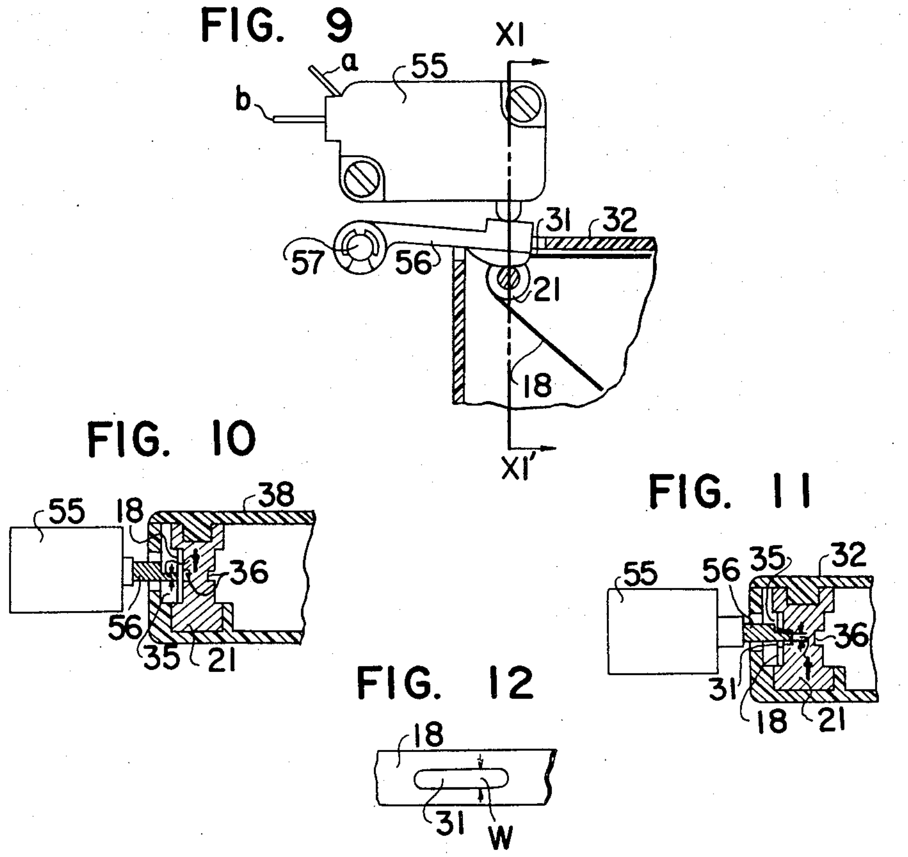
Figure 15:
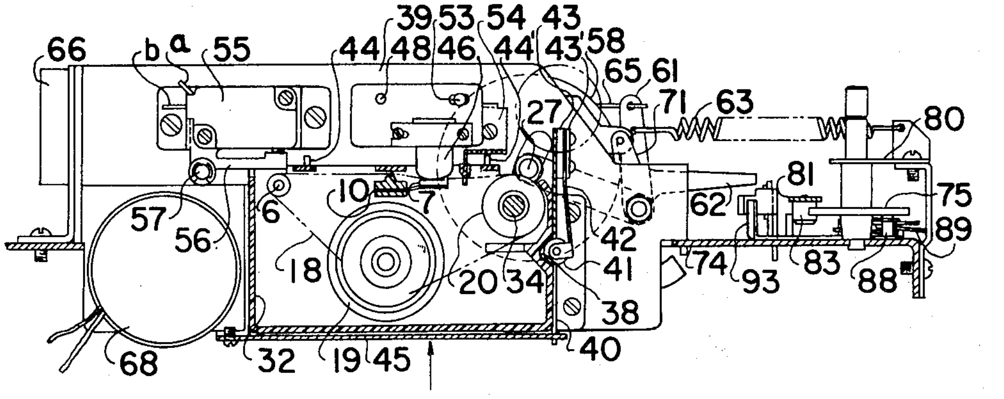
Figure 13:
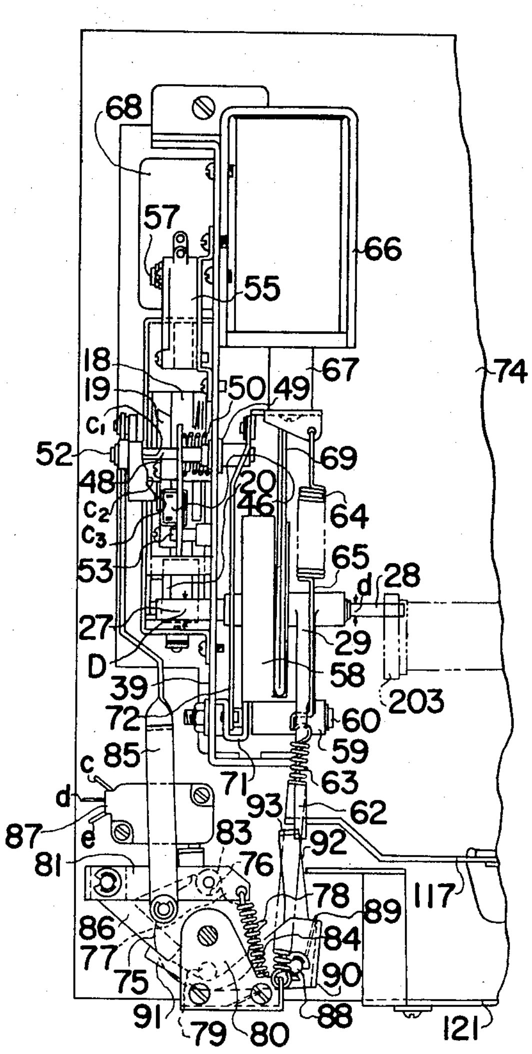
Figure 14:
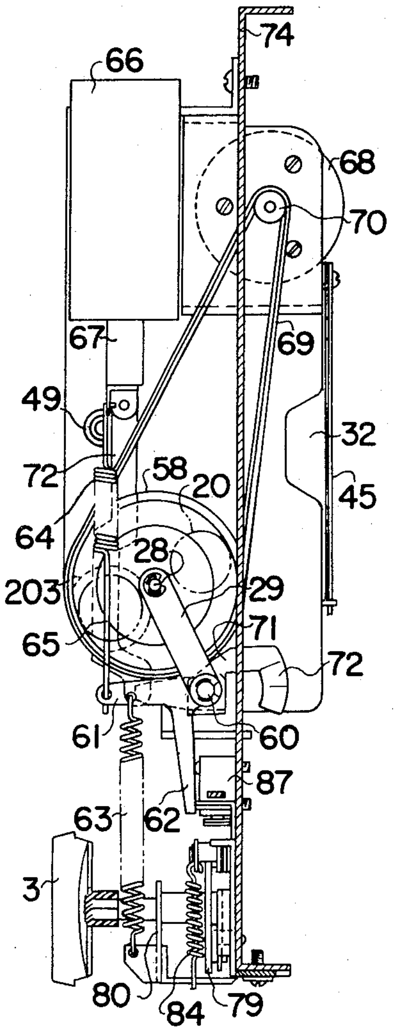
Figures 16, 17, 18, 19:
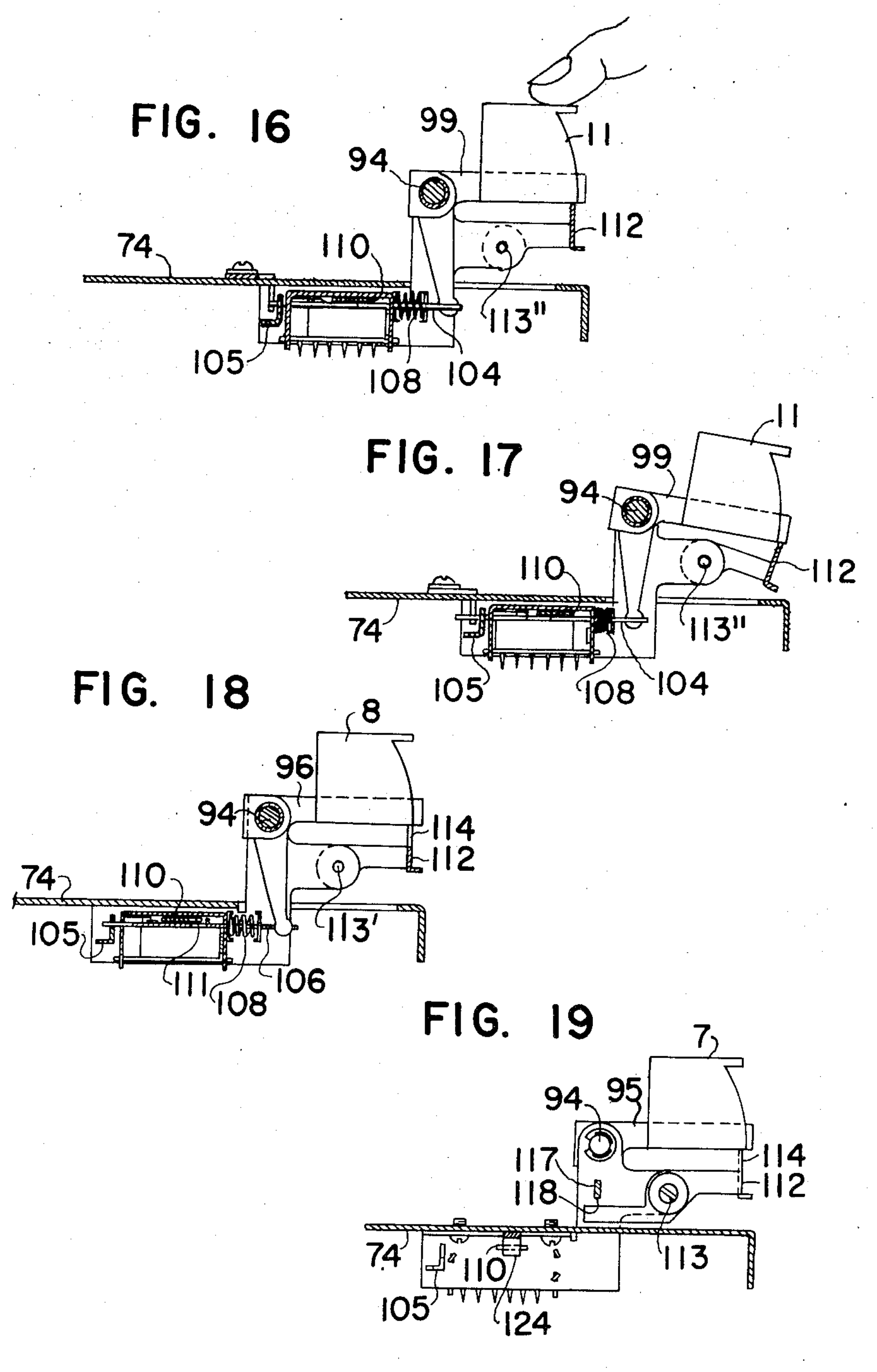
Figure 20:
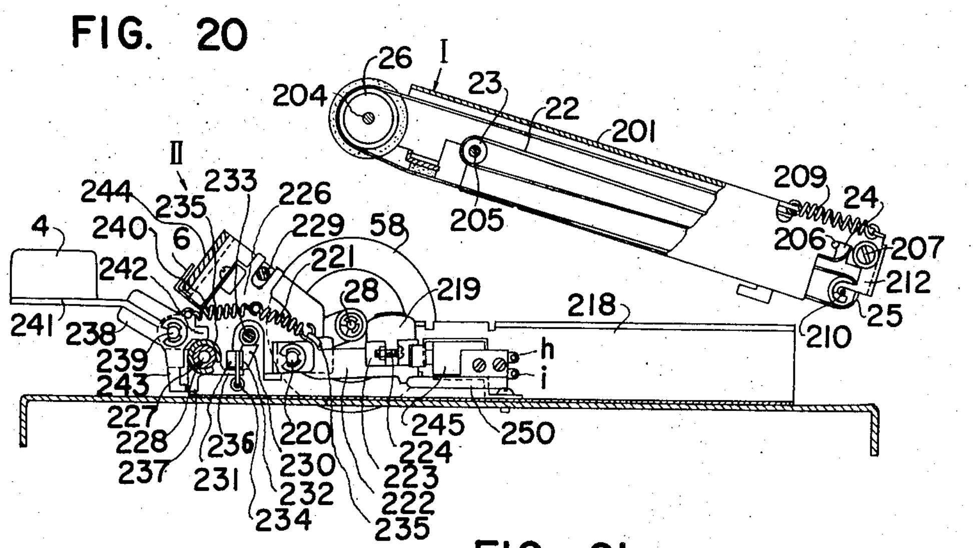
Figure 21:
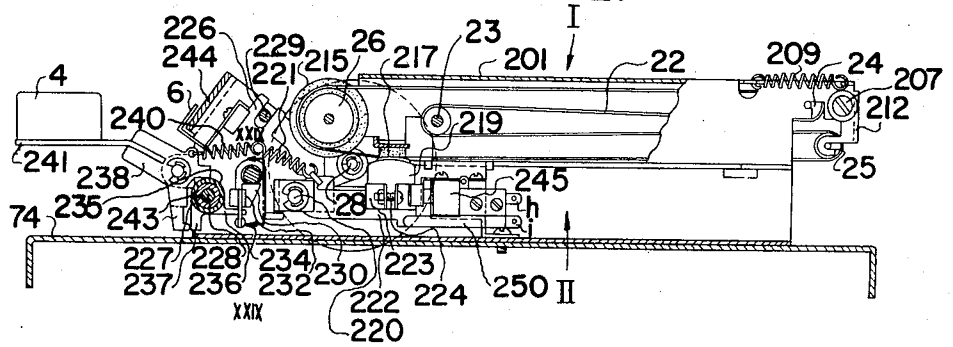

The above and other objects, features and advantages of the invention will be apparent from the following description in connection with the accompanying drawings in which:

FIG. 1 is a perspective view of an automatic answering telephone set according to the invention, FIG. 2 shows schematically the principle of the tape driving mechanism, FIGS. 3, 4 and 5 are respectively a plan, front and back view showing an internal mechanism of the set, FIG. 6 is a sectional view along VI—VI' in FIG. 3, FIG. 7 is a sectional view along VII—VII' in FIG. 3, FIG. 8 is an enlarged view of the encircled part in FIG. 6 which is a means for detecting one rotation of an answering tape cartridge, FIG. 9 shows an operating state of the means in FIG. 8, FIG. 10 is a sectional view along X—X' in FIG. 8, FIG. 11 is a sectional view along XI—XI' in FIG. 9, FIG. 12 is an enlarged view of a part of an answering tape, FIG. 13 is a plan view of the answering tape unit in FIG. 3 for showing a state that a magnetic head is changed to the position for an exclusive track for answering, FIG. 14 is a sectional view along XIV—XIV' in FIG. 13, FIG. 15 is a sectional side view of the answering tape unit in operation which corresponds to a state where an electromagnet as shown in FIG. 6 is energized, FIG. 16 is a sectional view along XVI—XVI' in FIG. 3, FIG. 17 shows an operating state of the means in FIG. 16, FIGS. 18 and 19 are sectional views along XVIII—XVIII' and XIX—XIX' in FIG. 3 respectively, FIGS. 20 and 21 are the same sectional views along XX—XX' in FIG. 3, except that a tape means (I) is removed in FIG. 20.

Figure 22:
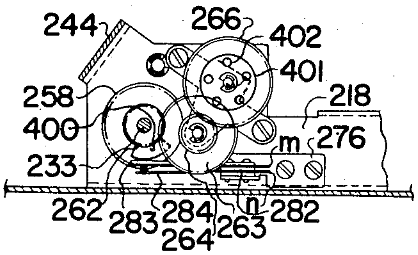
Figure 23:
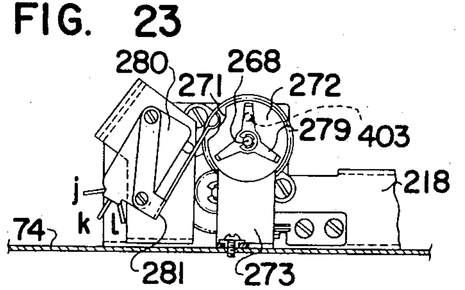
Figure 24:
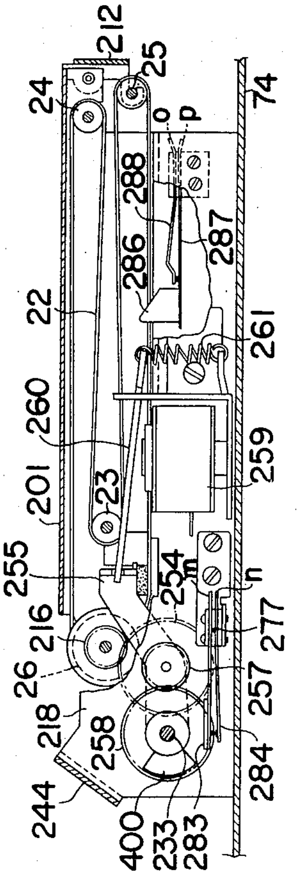
Figure 25:
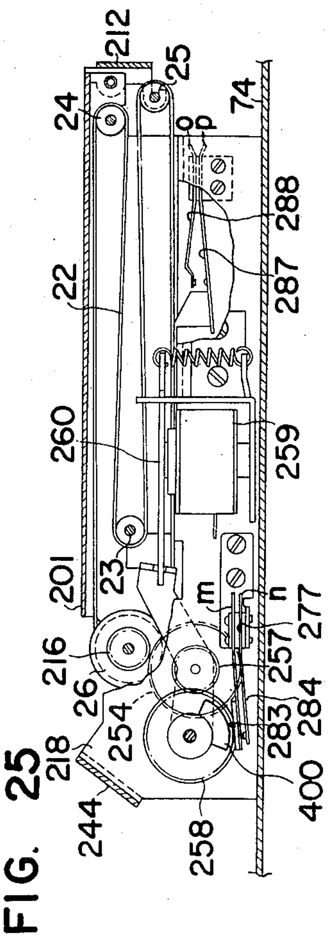
Figure 26:
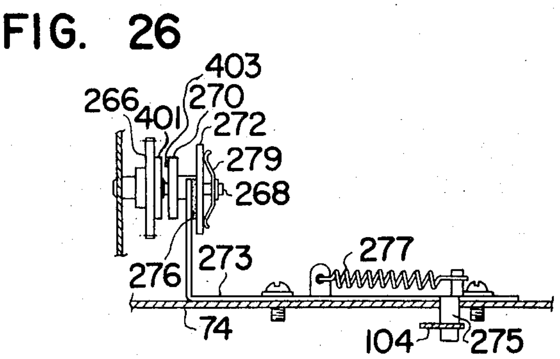
Figure 27:
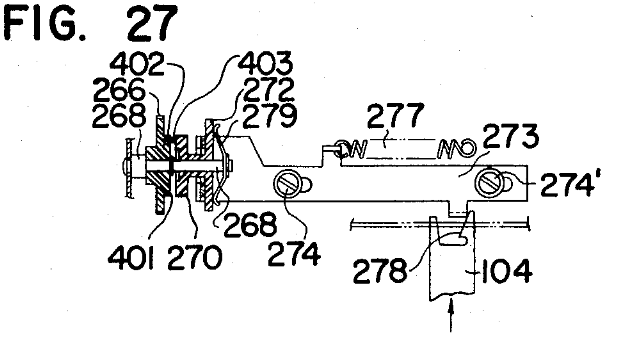
Figure 28:
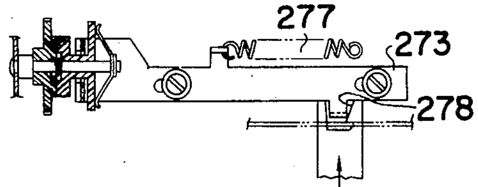
Figures 29, 30:
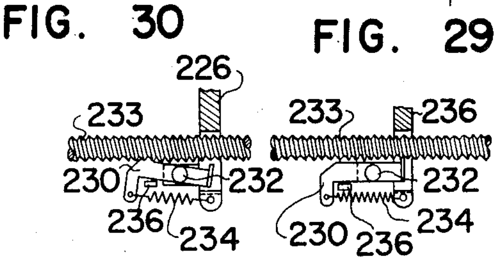
Figure 31:
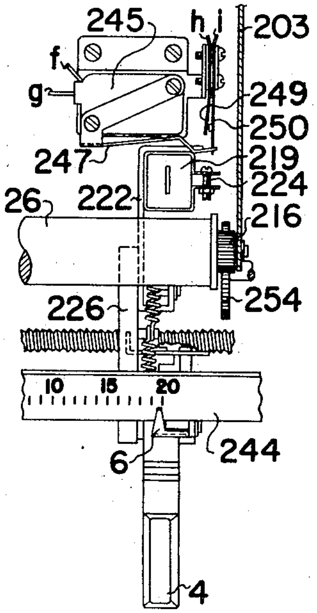
Figure 32:
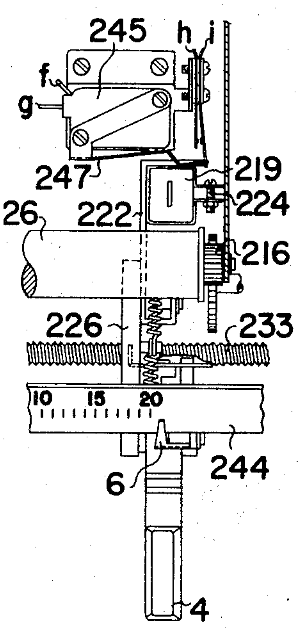
Figure 33:
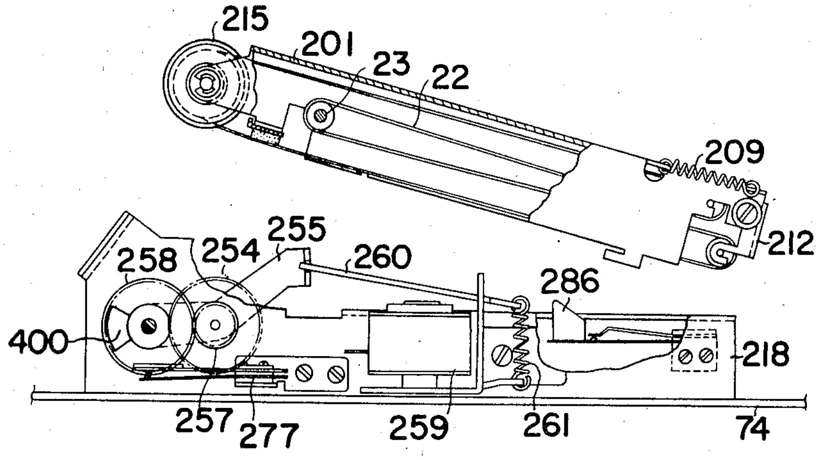
Figures 34, 36A, 36B, 36C, 36D, 36E, 36F:
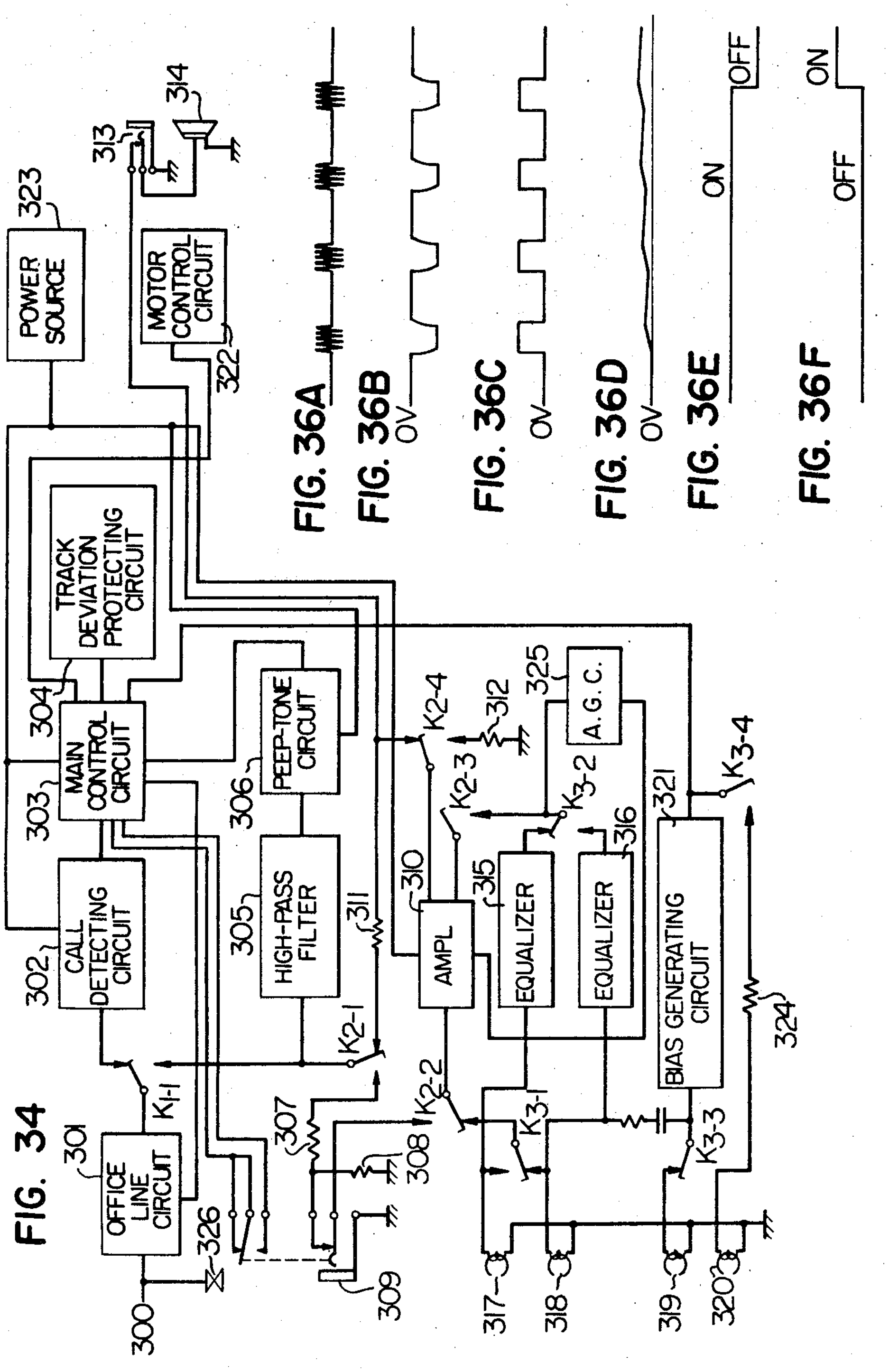

FIGS. 22, 23 and 24 are sectional views along XXII—XXII', XXIII—XXIII' and XXIV—XXIV' in FIG. 3 respectively, FIG. 25 shows a state where the electromagnet in FIG. 24 is energized, FIG. 26 is a sectional view along XXVI—XXVI' in FIG. 3, FIGS. 27 and 28 are enlarged views for respectively showing a normal and operating state of a principal part in FIG. 3, FIG. 29 is a sectional view along N—N' in FIG. 21, FIG. 30 shows an operating state of the means in FIG. 29, FIG. 31 is a plan view showing the recording head in a state where the recording is finished, FIG. 32 is a plan view showing the recording head at an operating position of a stop switch, FIG. 33 is the same view as FIG. 24 except the tape means I is removed, FIG. 34 is a block diagram showing the electric system, FIGS. 35*a*, 35*b*, 35*c* and 35*d* are respectively parts of an electric circuit which is divided in four parts as shown in FIG. 35*a*, and FIGS. 36*a*, 36*b*, 36*c*, 36*d*, 36*e* and 36*f* show the wave forms in the call detecting circuit.

An outer appearance of the set is shown in FIG. 1, in which 1 indicates a casing, 2 is a speaker grille formed on the upperside of the casing and the speaker is mounted on the underside of the grille for sounding a message. Reference numeral 3 indicates a track changing knob for selecting a desired one of the tracks on an answering tape. The knob is set to the second track in FIG. 1. The answering tape is provided with three tracks, as will be described is detail hereinafter. The first and second tracks are respectively recorded with answering messages which are different from each other in detail but include the same information that the caller's message cannot be received by anyone, but recorded on the tape. The third track is recorded with another message to inform the caller of the fact that no person is here. In other words, if the knob is located at the third position, the set is exclusively used for sending the answering message and the caller's message cannot be recorded. 4 is a knob to select one of the channels provided on the recording tape which is 3 inches wide. As will be described in detail hereunder, a magnetic head for the recording tape is gradually moved towards the right hand in FIG. 1 according to the progression of recording or reproducing and also can be manually moved towards both directions by push-and-moving the knob. Therefore, the knob can also select a certain reproducing position. In other words, the magnetic head can be directly returned to the original position with no rewinding operation as is usually seen in a reel-to-reel type taperecorder. 5 is an indicator to indicate the position of the magnetic head, which is graduated with 0 to 20 scales, the full scale corresponding to a 60mm width of the tape. It takes about twenty minutes for the magnetic head to be moved across the full scale. 6 is an index which is moved together with the magnetic head. 7, 8, 9, 10 and 11 are keys connected to the corresponding switches for operating various functions. If the key 7 is pushed but a microphone 12 is not inserted into a microphonejack 12*a*, the answering tape is reproduced. If the key 7 is pushed and the microphone 12 is inserted, the answering tape is arranged to record. If the key 8 is pushed, all functions of the set is stopped. The key 9 is used for reproducing the message on the tape. The key 10 is used for merely recording a usual conversation. If the key 11 is pushed, the automatic answering telephone set is arranged to operate the main function thereof and prepared for receiving a call. 13 is a volume control with a power switch, 14 an earphone, 14*a* an earphone jack, 15 a power source cord, 16*a* a recording indicator which becomes bright when the set is arranged to record on the answering or recording tape, 16*b* a driving indicator which is bright during the driving of each tape and 17 a power indicator.

Description will be made of the internal structure answering the set in conjunction with the drawings hereunder. FIG. 2 shows the principle of the tape driving mechanism. 18 is an endless tape one-fourth inch wide recorded with the answering messages which is wound on a hub 19 through several turns and supported in a loop by a pinch roller 20 and guide pin 21. 22 is a 3 inch wide endless tape for recording the caller's message which is supported with a suitable tension by three guide rollers 23, 24 and 25 and driving drum 26. 27 is a driving capstan to drive the andwering tape, 28 a driving capstan to drive the message recording tape. Both driving capstans 27 and 28 are rotatably fitted on a common axis at one end portion of a capstan arm 29, each capstan being driven by a motor. The answering tape 18 is rotated, when the capstan arm 29 is turned clockwise according to the operation of an electromagnet and thereby the capstan 27 contacts with the pinch roller 20. For driving the recording tape 22, the electromagnet is de-energized, and thereby the capstan 28 is forced against the drum 26 by a tension spring 30.

The internal structure will be described in detail with reference to FIG. 3 and other drawings. Firstly, in the answering tape unit, the answering tape 18 is provided with three tracks $T_1$, $T_2$ and $T_3$ as shown in FIG. 3. The track $T_1$ is recorded with the answering messages which are used to give the caller the information that there is no person to answer the phone and the caller's message will be recorded on the tape. The track $T_3$ is recorded with another answering message which only informs the caller of the fact that there is no person available to receive the caller's message. The track $T_2$ is recorded with almost the same message as the track $T_1$ and used for the same purpose. As abovementioned, the tracks $T_1$ and $T_2$ are recorded with the messages, each informing the caller of the information that the caller's message can be received by no person now but will be recorded by the taperecorder, and the track $T_3$ is recorded with only the message that there is no person to receive the caller's message. The answering tape 18 will be operated for thirty seconds when it is driven at a speed of 9.5 cm/sec, which corresponds to 2,850 mm of the tape length. The tape is formed with an elongated perforation 31 for detecting its one rotation as shown in FIG. 12, and set in a cartridge 32. In the cartridge 32, a hub 19, pinch roller 20, tape guide 21 and head pad 33 are respectively arranged as follows. The tape is wound on the hub 19 through several turns. The pinch roller 20 is rotatably fitted on the axis 34 and covered on its with a rubber tire. A first groove 35 having almost the same width as the tape and a second groove 36 having a width narrower than the width W of the elongated perforation are provided on the tape guide 21. The tape pad 33 is mounted on a free end portion of a spring plate 37, which is fixed to the cartridge by its end portion and is adapted to contact the surface of the magnetic head as mentioned hereunder. The cartridge 32 is formed with a plurality of openings at the positions opposite to the pinch roller, pad and guid pin respectively so that these elements are respectively engaged with the capstan, magnetic head and lever when the cartridge is inserted into the set. The lever is used for detecting one rotation of the answering tape. The cartridge also is formed with a V-shaped groove 38 to be engageable with a supporting roller. 39 is a base plate of the answering tape unit, 40 a metal frame which defines a housing for the cartridge. The cartridge is fitted into a cubic housing constructed with the base plate 39 and metal frame 40 as shown in FIG. 6. 41 designates a roller for supporting the cartridge which is movably provided at one end portion of a spring plate 42. The other end of the spring plate is fixed to the metal frame interposed with spacers 43 and 43'. The cartridge supporting roller is projected into the housing when the cartridge is removed from the housing. When the cartridge is first inserted into the housing the arrow shown in FIG. 6, the roller is pushed towards the outside of the housing. When the cartridge is further inserted to the point where it is restricted by stoppers 44 and 44', the roller engages the groove 38 of the cartridge so that the cartridge is temporarily supported by the roller. Then a lid 45 is shut at its entrance so that the cartridge cannot be slipped out of the housing. 46 is a magnetic head unit for recording, reproducing and erasing with a track 1.5 mm wide and fixed to a head base 47. An axis 48 is fixed to the head base and the portion elongated from one end of the axis inserted into a bore formed on the base plate with a compression spring therebetween. The magnetic head unit is urged towards the left in FIG. 3 and can be moved towards the right against the spring force. The other end of the axis is provided with a an arcuately shaped portion which is abutted to a track changing cam face 51. The track changing cam 51 is rotatably fitted on an axis 52 fixed to the metal frame 40 of the cartridge housing. The cam 51 has three cam faces $C_1$, $C_2$ and $C_3$. FIG. 3 shows the state that the arcuately shaped portion of the axis 48 is engaged with the cam face $C_2$ so that the magnetic head unit 46 is opposite to the track $T_2$. If the cam is turned by an external force till the end of the axis is engaged with the cam face $C_1$ or $C_3$, the magnetic head unit 46 is faced to the track $T_3$ or $T_1$ respectively.

53 is a pin fixed on the base plate 39, which acts as a guide when the head base 47 is moved. 54 is a guide for the tape running. 55 is a microswitch for detecting one rotation of the tape and 56 is a detecting lever which is movably fitted on an axis 57. One side of one end portion of the detecting lever 56 contacts a push button of the microswitch 55 and the other side of the end portion is formed to have a width narrower than that of the second groove of the guide pin 21. The narrow portion is normally pushed against the tape on the guide pin by the contact spring of the microswitch 55. FIGS. 8 and 10 show the above state. As abovementioned, the magnetic tape is formed with the elongated perforation 31 so that the detecting lever 56 is dropped into the second groove 36 through the perforation when it comes to the position opposite the lever. Then the microswitch is actuated as shown in FIGS. 9 and 11. The contact of the microswitch is opened at the normal state as shown in FIGS. 8 and 10.

58 is a flywheel which is formed with a belt pulley on a part thereof and movably supported on an axis fixed to the end portion of the capstan arm 29. The capstans 27 and 28 are fixedly inserted into the center bore of the flywheel. The body 59 of the capstan arm 29 is movably supported on an axis 60 which is fixed to the base plate 39. Two arms 61 and 62 are extended from the body 59 and the end portion of the arm 61 is forced by a tension spring 63 so that the capstan arm is urged to be turned clockwise. The end portion of the arm 61 is attracted by an elongated portion 65 of a tension coil spring 64. The other elongated portion of the spring is connected to one end of a plunger 67 of an electromagnet 66, fixed to the base plate 39. When the electromagnet 66 is energized, the capstan arm is rotated counterclockwise against the tension spring 63 and thereby the capstan 27 is pressed to the pinch roller 20 by the coil spring force 64. As a result, the rotational effort of the motor 68 is transmitted to the flywheel through a belt 69 and further transmitted to the tape through the capstan. Thus, the unit is brought to the state that the tape is driven as shown in FIG. 15. The motor rotates at a speed of 2,400 rpm, which is reduced to 390 rpm through the motor pulley 70 and flywheel. Hence the flywheel and capstan are rotated at 390 rpm. As the diameter of the capstan 27 is 4.65 mm, the answering tape is driven at 9.5 cm/sec. The other capstan 28 has a diameter of 3 mm. The motor 68 is rotated clockwise in the face of the load side when the answering tape 18 is driven and counterclockwise in the same face when the recording tape 22 is driven. The arm 62 is, as will be described hereinafter, used for limiting the position of the capstan 27 when the telephone set is changed to the exclusive use for answering, i.e., when the magnetic head is located at the position opposite to the track $T_3$ and the set is stopped. 71 is a lever which is used for preventing the key from being operated while the answering tape 18 is driven by energizing of the electromagnet 66. More detailed description will be made hereunder. The lever is movably supported on an axis 60. One end of the lever is connected to the plunger of the electromagnet 66 through a connecting plate 72 and the other end is provided with a cam portion 73 with a step of a height H. The above answering tape unit is mounted on the base plate 39 which in turn is mounted on the chassis 74 as shown in FIG. 3.

Next the method for shifting the magnetic head from one track to another will be described. This operation can be done by the track changing cam. 75 is an operating cam plate for changing the track which consists of three concave cam faces 76, 77 and 78 and a pin 79 fixed to the underside thereof. The operating cam plate 75 is rotatably supported on a bearing plate 80 which is fixed to the chassis 74. The end portion of the cam plate is provided with the changing knobs as abovementioned. 81 is a detent arm rotatably supported on an axis 82. A detent roller 83 is rotatably supported at the end portion of the detent arm which in turn is attracted by a spring 84 so that the detent roller face is pushed to the concave cam face of the cam plate 75. Hence the cam plate can be actuated as a detent mechanism. The operating arm plate 75 is engaged with the track changing cam 51 through a connecting plate 85 and is turned by rotation of the operating arm. For example, if the operating cam plate 75 is turned counterclockwise in FIG. 3 till the detent roller 83 is engaged with the concave cam 78, the track changing cam is turned counterclockwise in FIG. 7 and the cam face $C_3$ is abutted to the arcuate end of the shaft 48, and thereby the magnetic head 46 is moved to the position opposite to the track $T_1$. 86 is a V-shaped lever being rotatably fitted on the axis 82. The lever 86 has two arms, one of which contacts with a push button of the microswitch 87 having terminals *c*, *d* and *e*. The other arm is elongated towards a curved arm 91 of a lever thereby to restrict the movement of the capstan arm which otherwise is turned clockwise on the axis 88 by a spring 89. When the lever 90 is turned clockwise, the end portion of the curved arm 91 pushes the V-shaped lever so that the microswitch 87 is actuated to change the position of the magnetic head. The lever 90 for preventing the capstan arm from movement is provided with a straight arm 92 which is elongated and opposite to the curved arm 91. The end portion 93 of the arm 92 is bent and elongated perpendicular to the chassis. The curved arm 91 of the lever 90 is engaged with the pin 79 fixed on the operating cam plate 75 so that the lever is prevented from being rotated by the spring 89. When the operating cam plate 75 is rotated counterclockwise in FIG. 3 till the detent roller 83 is engaged with the concave cam face 77, the pin 79 is also moved to the position 79' as shown in FIG. 3, and the arm 90 is held at the same position. But, if the operating cam plate 75 is rotated counterclockwise till the detent roller 83 is engaged with the other concave cam face 76, the pin 79 is moved to the curved portion 93 of the curved arm 91 so that the lever 90 is rotated clockwise and the V-shaped arm is rotated. The microswitch 87 is actuated to change the position of the magnetic head, while the curved portion 93 of the straight arm 92 is moved to the underside of the elongated arm 62 of the capstan arm 29, which prevents the capstan arm from rotating clockwise, i.e., the recording tape cannot be driven. Thus, the tape unit is operated in such a way that the recording tape cannot be driven when the magnetic head 46 is located at the position opposite to the track $T_3$. The track $T_3$ is exclusively used for merely sending the answering message, hence the recording is not operated in this case. If the lever 90 to prevent the capstan arm from the rotation were not provided in the unit, the following malfunction might occur. When the answering message is reproduced after receiving a call, the answering tape is driven by the counterclockwise rotation of the capstan arm 29 which in turn is actuated by the electromagnet 66. After a moment, the reproducing of the answering message is finished and the electromagnet is de-energized so that the capstan arm 29 is returned to the initial position by the spring 63. In the above operation, the capstan 28 cannot make contact with the driving roll to rotate the recording tape since the capstan arm 29 is prevented from such an actuation when the arm 62 is engaged with the curved portion 93. However, if the set is not provided with the lever, the capstan 28 might make with the driving roll so that the recording tape 22 is driven for a short time because the capstan is rotated by its inertia even if the power is cut off. Hence, the automatic answering telephone set might be stopped before its full capacity, i.e., the 20 calls in this case, is effected.

Next, the description will be made of the operating keys, consisting of five keys, each having the purpose as abovementioned. These keys are respectively mounted on levers 95, 96, 97, 98 and 99, each being rotatably mounted on a common axis 94. The end portions of the levers 95, 97, 98 and 99 are respectively engaged with changing levers 101, 102, 103 and 104 to actuate a slide switch 100. When a given one of the keys is pressed, the lever engaged with the key is rotated on the axis 94, which in turn pushes one of the changing lever, and then the slide switch is actuated, thereby the set being arranged for the function corresponding to the key pressed now. When the key is pushed, the corresponding one of the levers 101, 102, 103 and 104 is slid and locked in the position by means of a lock lever 105 that is forced to be moved in a certain direction by a spring. A rotating lever 96 connected with a stop key 8 is engaged with a lock release lever 106 in the same manner as that in the changing lever for the slide switch. The release lever 106 is formed with a slant cam face 107 at the end portion thereof. When the key 8 is pushed, the release lever 106 is slid thereby to release the locking of another lever by its slant cam face, but the release lever itself is not locked. 108 is a tension spring to set the keys. The lock release lever 106 has a projection 109 opposite to a notch 111 of the slide lever 110. The slide lever is urged towards the right in FIG. 5 by a spring force so that the notch is opposite to the projection 109. When the slide lever 110 is moved towards the left against the spring force, the projection cannot engage the notch so that the lever 106 becomes inoperative. 112 is a channel-shaped lever which is rotatably supported on both axes 113 and 113' and has a notch 114 thereon. The upper edge of the lever 112 contacts with the undersides of the keys 9, 10 and 11. The lever 112 is turned clockwise when facing the left side view in FIG. 3 when any one of the keys 9, 10 and 11 is pushed as shown in FIG. 17. 117 is a rocking lever which is rotatably supported on an axis 116 fixed to the chassis 74. The end portion of the channel-shaped lever 112 is engaged with the underside of the end portion of the rocking lever 117. When the lever 112 is turned, the rocking lever is moved upwards. The other end of the rocking lever is engaged with the underside of the arm 62 of the capstan arm to thereby restrict its rotation. The rocking lever 117 is forced to be turned clockwise by a spring force 119. The rocking lever is adjusted by a screw 120 so that both the capstans 27 and 28 are normally, i.e., when no key is pushed, positioned at a neutral position where the capstans contact with neither the pinch roller 20 nor the driving drum. The screw 120 is also used for supporting the rocking lever at the neutral position. The rocking arm is disengaged with the underside of the arm 62 so that the set is arranged for the recording operation. For this purpose, the arm of the rocking lever is moved downwards by rotating the channel-shaped lever 112 so that the capstan arm becomes free to be moved. 121 is a lever which is slidably fitted on the front side of the chassis 74. The end portion of the lever is formed with a slant cam face 122. The slant cam face 122 contacts with the underside of the lever 123 which is fixed to the key 9. When the key 9 is pushed, the lever 123 is slid towards the left hand. The other end of the lever 121 is opposite to the straight arm 92. When the magnetic head 46 is moved to the position opposite to the track $T_3$ as shown in FIG. 13 and the key 9 is pushed to reproduce the recording tape, the arm 62 of the capstan arm 29 must be prevented from engaging with the curved portion 93 of the straight arm 92, otherwise the capstan 27 might engage the driving drum to drive the recording tape. The slide lever 117 has the purpose that the straight arm 92 is always disengaged from the underside of the arm 62 when the key 9 is pushed and the slide lever is moved towards the left hand. 124 is another slide lever which is provided on the underside of the chassis. One end of the slide lever 124 contacts the cam face 73 of the lever 71 and the other end contacts the end portion of the slide lever 110 which is provided in the key unit as shown in FIG. 5. When the electromagnet 66 is energized, the answering tape is driven, while the lever 124 is moved by a distance equal to the step height H of the cam 73 towards the left hand in FIG. 5 as the result of the lever 71 being turned by means of the electromagnet 66 and thereby the slide lever 110 is shifted so that the notch 111 thereon is moved from the position opposite to the projection of the lock releasing lever 106. Consequently, the set is protected from an unexpected stop of the operation, such as a careless push of the key 8. As will be described hereinafter, the answering tape is automatically stopped after one rotation. 125 is a volume control with a power switch, 126 a record indicating lamp, 127 an operation indicating lamp, 128 a power indicating lamp and 129 a speaker.

The structure of the recording tape unit will be described hereunder. The unit is used for recording the caller's message on the wide endless tape after the answering operation is completed. The unit includes the endless magnet tape having a width of 3 inches as a recording medium and the magnetic head unit having a track of 0.6 mm wide for recording, reproducing and erasing. The magnetic head unit is designed to be moved transversely across the tape width. In FIG. 20, the recording tape unit consists of case mechanism I which supports the 3 inch wide endless tape 22 and a magnetic head unit shifting mechanism II which has a mechanism for moving the magnetic head unit transversely across the tape width. First, in the tape case mechanism I as shown in FIG. 20, 201 is a case body which has a channel-shaped section and provided with two parallel side plates 202 and 203, opposite to each other. The tape driving drum 26 is rotatably supported on an axis 204 and the two guide rollers 23, 24, are rotatably supported on axes 205 and 206 respectively. Another guide roller 25 is rotatably mounted on an axis 210 fixed to a tension arm 212. The tension arm 212 is rotatably supported by two axes 207 and 207', and is urged counterclockwise by two springs 208 and 209. The magnetic tape 22 is supported with a suitable tension on the guide rollers 23, 24 and 25, and the drum 26. The elongated perforation 211 formed on the magnetic tape is provided with a function as described hereunder. The tape driving drum 26 has two flanges 213 and 214 for preventing deviation of the tape, a rubber roller 215 having a diameter of 23 mm at one end thereof and a gear 216 having 20 teeth at the other end. The rubber roller 215 is positioned to be in contact with the capstan 28 in operation. The roller 215 contacts the capstan and transmits a rotational effort from the motor to the capstan for driving the recording tape 22. The rubber roller 215 is rotated at about 51 rpm so that the capstan having a diameter of 3 mm is rotated at 390 rpm. Hence the driving drum having a diameter of 18 mm rotates at 51 rpm. The outer face of the driving drum is coated with a rubber lining for increasing the friction against the tape. The tape 22 is driven at a speed of 4.8 cm/sec by the driving drum 26. This speed corresponds to an operating time of 20 sec for each one rotation. 217 is the case body, which has a length longer than the tape width, i.e., 3 inches.

The head driving mechanism is structured as follows. 218 is a base plate and 219 is the magnetic head unit consisting of two heads, i.e., a recording and reproducing head having a core 0.5 mm wide and erasing head having a core 0.6 mm wide. The head unit is fixed by a head band 223 and a screw 224 on the end portion of the head arm 222. The head arm is urged counterclockwise by a spring 221. The end portion of the head arm is also provided with a bent piece 225 to operate a leaf-switch. 226 is a head supporting member which is slidably fitted on an axis 228 with a bearing 227 therebetween. The axis 228 is fixed to the base plate. The axis 220 of the head arm 222 is fixed to the supporting member 226 which is moved transversely across the tape width. 229 is a guide pin for the supporting member 226. 230 is a head shifting pawl for moving the head according to the tape driving. The pawl 230 is rotatably supported on a pin 232 fixed to a tongue 231 which in turn fixed to the head supporting member 226. One end of the pawl is engaged with a thread of a screw 233. A spring 234 is connected between the other end of the pawl and the supporting member 226 and thereby the pawl engages with the screw thread as shown in FIG. 29. 235 is a turning member to disengage the pawl 230 with the screw 233, whereby the magnetic head can be manually moved. The turning member 235 is rotatably fitted on the bearing 227 and provided with two tongues 236 and 237 which are extended towards the directions perpendicular to each other. The tongue 236 is extended under the pawl 230. When the turning member 235 is turned counterclockwise thereby to disengage the pawl 230 with the screw thread, the magnetic head can be manually moved. 238 is a supporter for a knob 4 that is used to manually operate the head, and is rotatably fitted on an axis 239 fixed to the head supporting member 226. A spring 240 normally urges the supporter 238 in a clockwise direction. The knob 4 is fixed to one end portion of the arm 241 which, in turn, is fixed to the supporter 238. The supporter 238 also is provided with a stopper 242 which contacts the outer surface of the turning member so as to define the position of the supporter 238 and with a projection 243, the end of which contacts the tongue 237 of the turning member 235. In the case of manual operation of the head 219, firstly the knob 4 is pushed and moved towards the right or left hand. When the knob is pressed downwards, the supporter 238 is turned counterclockwise against the spring force thereby to cause the turning member to be pushed by the projection 243 and turned counterclockwise. As the result of the above operation, the tongue 236 causes the pawl to be disengaged and thereby the head 219 becomes free to move. 6 is the index fixed to the head supporting member 226, as described above, which is moved together with the head. 244 is a dial for indicating the head position having a scale divided 0 to 20, with each division corresponding to 3 mm of tape width as shown in FIG. 1. This means that the head 219 is arranged so as to be moved across the 60 mm width of the tape 22. 245 is a microswitch having a normally opened contact and actuater 247 provided with a slant cam face 246. The contact consisting of the terminals f and g, is opened at the state in FIG. 3. The microswitch 245 is used for detecting the twentieth call, which is a final call for the set because the set cannot deal with more than twenty calls as described after. As shown in FIG. 31, when the index is positioned between 19 and 20 of the scale, the microswitch 245 is pushed by the actuator 247, with a result that the microswitch is actuated. 248 is a leaf-switch consisting of two leaf spring 249 and 250. At such a state as shown in FIG. 3 or FIG. 31, the terminals *h* and *i* of the leaf-switch are closed. When the head is moved and the index is moved over the full scale, the bent piece 225 of the head arm pushes the leaf spring 250 as shown in FIG. 32, with a result that the terminals *h* and *i* are opened. When the set is arranged for the automatic answering operation, the head is prevented from moving over the scale, with the result that the microswitch detects the twentieth call. The leaf-switch is actuated not only to protect the system from an expected failure in the above operation, but to automatically stop the tape when a reproducing of the tape is completed. In such a case, the power supply is cut off by the leaf-switch 248. Incidentally, when the recording tape 22 is driven, the capstan 28 and the driving drum 26 are respectively rotated counterclockwise and clockwise. The screw 233 is provided with a right-handed thread having a 0.6 mm pitch, thereby the head 219 is moved by 0.6 mm according to one rotation of the screw. The screw 233 is rotatably supported by two bearings 251 and 252. One end of the screw is pushed by a spring plate 253 and other end is supported with a curved portion of the dial, whereby the screw is supported with no play in the longitudinal direction. 254 is a gear having 50 teeth for transmitting the driving drum rotation to the screw 233. The gear 254 is supported with a bearing 256 so as to be rotated together with a gear 257 having 24 teeth. The bearing 256 is fixedly mounted on a L-shaped arm 255, which is rotatably supported in coaxial with the bearing 252. The gear 257 is engaged with another gear 258 having 48 teeth and fixed to the screw shaft. The L-shaped arm 255 is engaged with one end portion of a movable piece 260 provided to the electromagnet 259 as shown in FIG. 24. The other end of the movable piece is attracted by a spring 261 thereby to cause the gear 254 to be engaged with a gear 26 of the driving drum 216. As a result, when the electromagnet 259 is de-energized, the rotation of the driving drum 26 is transmitted to the screw 233 through the gears 216, 254, 257 and 258. The drum 26 is rotated counterclockwise in face of the left side in FIG. 3, hence the screw 233 having a right-hand thread is also rotated counterclockwise thereby to cause the head 219 to move towards the right-hand according to progression of the tape. The gear ratio of the above gear mechanism is determined in such a manner that one rotation of the screw corresponds to five rotations of the drum which, in turn, corresponds to about a half of the tape total length, i.e., a half of 576 mm. This means that the screw 233 is turned by one rotation when the tape is driven by almost a half rotation thereof. When the electromagnet 259 is supplied with a source voltage, the movable piece 260 is attracted to the magnet, thereby the gear 254 being disengaged from the gear 216 as shown in FIG. 25 and no rotation being transmitted to the screw from the drum. 262 is a gear having 22 teeth coaxial with the gear 258. 400 is a fan-shaped cam which is mounted between the gears 258 and 262 and rotated according to the gear rotation. 263 is a gear having 44 teeth and 264 is a gear having 20 teeth. Both gears are mounted on the same axis 265. The gear 263 is engaged with the gear 262. 266 is a gear having 50 teeth and rotatably mounted on an axis 268. The gear 266 is prevented from moving along the axis by a snap ring 269. The gear 266 is engaged with the gear 264 with a predetermined angle relation therebetween as described hereinafter. A disc 401 having five holes 402 with the same angle relation therebetween is coaxially fixed to the flat side of the gear 266 as shown in FIG. 22. 270 is another disc having a diameter almost equal to that of the disc 401. The disc 270 is provided with a pin 403 being adaptable to be engaged with any one of the five holes 402. The disc 270 is formed integrally with a timer cam plate 272 having a concave cam face 271.

The disc 270 is movable along the axis 268. 279 is a conical spring plate fitted on the axis 268 for forcing the cam plate 272 towards the gear 266 by its spring force. In other words, the pin 403 and the holes 402 are actuated as a clutch. 273 is a clutch changing plate for engaging or disengaging the above clutch mechanism, which is slidably supported by axes 274 and 274'. The clutch changing plate 273 has a tongue 275 which is bent towards the changing lever 104 for the slide switch. The left-hand end portion of the changing plate 273 is bent almost perpendicular to the chassis 74 and contacts with the rear side of the cam plate 272 through a rubber plate 276 therebetween. The clutch changing plate 273 is normally forced by a spring 277 towards the right hand in FIG. 3, thereby the clutch mechanism being disengaged. When the key 11 is pushed, the clutch changing plate is pushed towards the arrow mark in FIG. 7, with a result that the clutch changing plate 273 is moved towards the left hand in FIG. 3 against the spring 277 by means of the slant face 278 on the end portion thereof, which in turn causes the clutch to be disengaged as shown in FIG. 28. 280 is a microswitch having three terminals *j*, *k* and *l*, and an actuator 281. The actuater end contacts with the outer surface of the cam plate 272. When the concave cam face 271 of the cam plate is engaged with the actuator end as shown in FIG. 23, the microswitch is at the normal state. As described in detail hereinafter, the cam plate 272 is turned by one rotation every five rotations of the screw 233. The microswitch is actuated so as to limit the time of each cycle of the answering and recording operation. In other words, the operation of the caller's message recording is stopped every one rotation of the cam plate, i.e., five rotations of the screw, while the magnetic head is moved by 3 mm from the position of the last operation, or one division of the scale. 282 is a leaf-switch consisting of two leaf springs 283 and 284, i.e., normally opened terminals m and n. 400 is a fan-shaped cam which is formed integrally with the gear 258. When the fan-shaped cam 400 is positioned as shown in FIG. 25, the terminals m and n are closed while the fan-shaped cam 400 contacts with the leaf-switch according to a rotation of the screw. Description will be made of the relation between the angle positions of the fan-shaped cam 400, gear 266 and cam plate 272. These elements are so arranged that when the terminals m and n are closed by engaging of the fan-shaped cam 400 and the leaf-switch as shown in FIG. 22, the pin 403 is positioned to be engaged with one of the holes 402 thereby to effect the clutch action and simultaneously the concave cam face 271 of the cam plate 272 is positioned to be faced to the end of the actuator. Hence, when the fan-shaped cam 400 is disengaged with the leaf-switch the automatic answering cannot be operated even if the key 11 is pressed for the purpose, since the pin 403 is engaged with none of the holes. In this state, the disc 270 is separated from the disc 401 against the force of the conical spring plate 279. Then, the pin 403 is engaged with one of the holes 402 when the fan-shaped cam is moved to the position as shown in FIG. 22. 286 is another leaf-switch having two leaf-springs 287 and 288, i.e., terminals *o* and *p*, which are normally separated from each other with the tape therebetween. When the elongated perforation 211 of the tape is passed therebetween as shown in FIG. 24, the leaf-switch 286 is closed. A base plate 218 of the head shifting mechanism is fixed to the chassis. The main part of the tape case 201 is fixed to the base plate as shown in the drawings.

FIG. 34 is a block diagram showing the electrical circuit system. 300 is an office line connected to a switch board. 326 is a telephone connected with the office line. When a call is sent from the office through the office line 300, the call is transmitted to a call detecting circuit 302 through an office line circuit 301 and switch relay K1–1. The relay K1–1 is controlled by a main control circuit 303. An output of the call detecting circuit is supplied to the main control circuit 303, while the relay K1–1 is actuated so that the connection is changed and the office line is held at the state as if the telephone receiver is held up. By operation of the main control circuit 303, the answering tape unit and motor control circuit 322 are energized. Hence, the answering tape is driven for transmitting the answering message to the office line through the magnetic head 318, contact K3–1 of the head changing relay which is controlled by the main control circuit, relay contact K2–2 for changing the operation between recording and reproducing, recording and reproducing amplifier 310, relay contact K2–4 for changing the operation between recording and reproducing, fixed resistor 311 for determining the level of the transmission signal, relay contact K2–1 having the same function as the relay contact K2–2 and relay contact K1–1. After the endless tape recorded with the answering message is rotated by one rotation, i.e., for a half minute, the main control circuit 303 actuates to change the tape driving operation from the answering tape to the recording tape and the circuit is arranged to record the caller's message. The motor control circuit 322 acts to reverse the rotating direction of the motor. Simultaneously, a peep tone signal having an audio frequency of 1 $KH_z$ is produced for 2 to 3 seconds from a peep tone circuit 306. The peep tone signal is transmitted to the office line 300 through the relay contact K1–1 and office line circuit 301. By the peep tone signal, the caller can understand that the automatic telephone set is arranged to record his message on the tape. While the peep tone signal is transmitted to the caller, the tape driving mechanism is arranged to drive the caller's message recording tape, the driving motor, which has been arranged for reverse rotation, starting to drive the recording tape, the peep tone signal being partly recorded on the tape through the relay contact K2–1, attenuating resistors 307 and 308, micjack 309, relay contact K2–2 and amplifier 310. Then the caller's message signal is supplied to the amplifier 310 through the office line 301, relay contacts K1–1 and K2–1, resistors 307 and 308, micjack 309, and relay contact K2–2. An output of the amplifier 310 i.e., the caller's message signal is applied to the recording head 317 through the relay contact K2–3 and equalizer circuit 315. Further, an A.G.C. circuit 325 is connected with the amplifier 310 through the relay contact K2–3 so that the caller's message is recorded with a uniform level. After the set is arranged by the main control circuit 303 to record the message, a circuit 321 for producing a bias signal acts to feed a biasing and erasing signal to the magnetic head 319 through the relay contact K3–3, whereby the caller's message is recorded on the tape by the magnetic head. The output of the amplifier is also transmitted to a resistor 312 having a resistance value equal to that of the speaker 314. The speaker is not connected in the recording operation. The caller's message recording tape is a wide endless tape having a width of 3 inches and the head is moved transversely across the width of the tape during the recording. Therefor the caller's message is recorded on the tape along a spiral track. Consequently, when the recorded message is reproduced, the magnetic head should exactly follow the recorded track. A circuit 304 is provided for preventing the magnetic head from being driven on a wrong way. The circuit 304 is also controlled by the main control circuit 303. By means of the main control circuit and mechanical timer, the peep tone circuit 306 produces a signal for about two seconds after the recording tape is driven for one minute. The peep tone signal is sent to the caller for informing of the completion of the recording operation through the office line 300, and then the main control circuit 303 is reset to the starting state as shown in FIG. 34. That is, the office line is disconnected from the office line circuit and the relays K1–1, K2–1 and etc. are reset to the original state respectively. 323 is a DC power source, 309 a jack to be connected with the microphone, 316 an equalizer circuit, 314 a fixed resistor for determining a DC erasing current of the erasing head 320, 313 a earphone jack which is used to monitor the recording of the answering message and to hear the caller's message. The head for recording and reproducing the caller's message and the head for biasing and erasing are integrally arranged in a three-in-one type magnetic head unit. The heads for the answering tape are also integrally arranged in the same type magnetic head unit.

In the case of reproducing a caller's message, the set is changed to the reproducing slate through the main control circuit 303 as follows. The relay K3, the tape driving mechanism and the driving motor are to the conditions for reproducing the caller's message, thereby the message signal recorded on the tape being transmitted to the amplifier 310 through the relay contacts K3–1 and K2–2. The amplified signal is transmitted to the speaker 314 or the earphone through the relay contact K2–4 and the earphone jack 313, thereby the message being confirmed by either the speaker or the earphone.

In case of recording an answering message, a microphone is connected to the micjack 309, the main control circuit being set to the state for the purpose, and the tape driving mechanism is changed so as to drive the answering tape. An output signal of the microphone is transmitted to the amplifier 310 through the relay contacts K3 and K2 and an amplified signal is fed to the head 318 for recording the answering message through the relay contacts K2–3 and K3–2, and the equalizer circuit 316, while a bias current is supplied from the bias signal generating circuit 321 to the head 318 through the capacitor and resistor according to the signal produced by the main control circuit 303. Simultaneously, a erasing current is supplied to the demagnetizing head for the answering tape through the relay contact K3–4 and a variable resistor 324 for adjusting the current. As a result of the above operation, the answering message is recorded on the tape. The recording time is 30 seconds, which corresponds to the time for one rotation of the tape. In case of reproducing the answering message, the microphone is disconnected from the jack 309 and the circuit is changed to the condition of reproducing by means of the main control circuit, whereby each relay is reset to the original state as shown in FIG. 34, the tape driving mechanism being kept in the position for the answering tape. A reproducing signal of the head 318 is transmitted to the amplifier 310 through the relay contacts K3–1 and K2–2 and the amplifier signal is applied to the speaker through the relay K2–4 and the earphone jack 313.

In the above operation, the main control circuit is changed to the respective conditions by the keys which consist of five keys for automatic answering, conversation recording, reproducing, recording and reproducing of the answering message and stopage. These keys will be disclosed hereinafter.

FIGS. 35*a*, 35*b*, 35*c* and 35*d* show the respective parts of an electric diagram, which is divided in four as shown in FIG. 35*a*, of an embodiment according to the invention. 327 and 328 are terminals of the automatic answering set to be connected with the office line, 329 a telephone set, 331 and 332 being a capacitor and resistor for applying only a call signal to the call detecting circuit, 333 a capacitor for receiving a message, 330 a resistor for holding the office line at the state of talking after receiving a call, $T_1$ a coupling transformer which transmits call and message signals to the call detecting circuit and the amplifier, or an output signal of the amplifier to the office line. A circuit consisting of the above elements is an office line circuit. Next, $D_1$ is a rectifier diode and a resistor 335, a capacitor 336 and a transistor $Tr_1$ constitutes a integrating circuit for converting a call signal to a rectangular pulse. 334 is a resistor. The transistor $Tr_1$ is normally conductive by a bias current supplied through the resistor 334. $D_2$ is a diode, through which a capacitor 337 is charged or discharged depending on the non-conductive or conductive states of the transistor $Tr_1$, respectively.

Next, a track deviation protecting circuit includes a flip-flop consisting of two transistors $Tr_{11}$ and $Tr_{12}$, a coil $PL_1$ of the electromagnet 259 connected with the output terminal of the flip-flop, a contact $S_3$ of the leaf-switch 286 to detect one rotation of the caller's message recording tape, a contact $S_5$ of the leaf-switch 282 to detect one rotation of the head moving screw. The flip-flop is triggered by either a signal applied through a diode $D_{30}$ or a signal applied through a capacitor 348, resistor 349 and the contacts $S_5$. A peep tone circuit includes a oscillating transistor $Tr_{18}$, an input transistor $Tr_{19}$, a resistor 357 and capacitor 356 for controlling the oscillation and other elements such as a transistor $Tr_{17}$, and coupling capacitor 359. $Tr_3$ and $Tr_4$ are transistors composing the Schmitt circuit, in which the transistor $Tr_3$ is triggered from on to off when the capacitor 337 is charged with a voltage over a predetermined value, while the transistor $Tr_4$ is triggered vice versa, whereby the main control circuit is controlled. The above elements constitutes the call detecting circuit. A high-pass filter is composed of capacitors 360 and 361 and a resistor 362. A motor controlling circuit is composed of a saturation type flip-flop including transistors $Tr_{22}$ and $Tr_{23}$, and a switching circuit including two transistors $Tr_{24}$ and $Tr_{25}$ in series connection. The flip-flop and the switching circuits are connected in cascade with each other and the motor to be controlled is connected between the above two circuits as shown in FIG. 35*c*. A circuit for producing the bias signal is composed of transistors $Tr_{20}$ and $Tr_{21}$, transformer $T_4$ for oscillating, other resistors and capacitors. The bias signal is fed to the magnetic head for the answering tape through the resistor 382 and capacitor 383 in the recording operation. The erasing current of the erasing head for the answering tape is fed through a resistor 344 and the erasing head for the recording head is supplied with its erasing current from the bias signal generating circuit. 386 is the recording and reproducing head for the caller's message. The recording and reproducing amplifier includes an integrated circuit 396, driver transformer $T_2$, output transformer $T_3$, variable resistor 397, and other resistors and capacitors. An equalizer circuit for reproducing includes a capacitor 375 and resistor 376. A capacitor 374 and resistor 373 constitute another equalizer circuit which is used for recording. A circuit including a capacitor 378 and resistors 377 and 379 is an equalizer circuit for the caller's message recording operation. A acpacitor 380 and resistors 377 and 381 constitute an equalizer circuit for the answering message recording. An AGC circuit consists of voltage dividing resistors 369 and 370, half-wave rectifier diode $D_{24}$, smoothing capacitor 371 and bias resistor 372. 363 and 364 are resistors for attenuating the caller's message signal in the automatic answering and recording operation. 365 is a resistor to determine the transmission level of the answering message. 366 and 367 are matching resistors each having an impedance value equal to the speaker 368. 366 and 367 are respectively resistors in the recording and answering circuit. $J_1$ is a microphone jack having a changing switch $S_8$ which is actuated by insertion of the microphone. By changing action of the switch $S_8$ the control circuit is operated to reproduce or record the answering message, i.e., reproducing when the microphone is connected and the answering message key is pushed, and recording when the microphone is disconnected and the same key is pushed. The main control circuit consists of four parts. The first part is a power supply circuit which includes a diode $D_4$ to transmit an output of the call detecting circuit, capacitor 338 to extend the operating time of the main control circuit, transistor $Tr_5$ to control a power transistor $Tr_{26}$, diode $D_7$ to stabilize the operation of the transistor $Tr_5$ and a group of diodes $D_5$ and $D_{13}$ and resistors 344 to hold the transistor $Tr_5$ at conduction. The second part is a relay control circuit which consists of a flip-flop including two transistors $Tr_6$, $Tr_7$ and a capacitor 342, a group of a diode $D_{10}$, a resistor 340 and a capacitor 341 for operating the circuit for a while after the power supply is cut off, a relay $RL_1$ for changing the circuit to be connected with the office line, a relay $RL_2$ for controlling a plunger $PL_2$ which mechanically changes the mechanism in case of recording and reproducing the answering message, a transistor $Tr_{10}$ for controlling the relay $RL_2$, a diode $D_{16}$ for receiving the output of the call detecting circuit, a group of resistors 346, 347, a capacitor 345 and a diode $D_{18}$ for driving the transistor $Tr_{10}$, a diode $D_{19}$ for discharging a capacitor 345, a relay $RL_3$ for changing the head and a relay $RL_4$ for changing between recording and reproducing. The third part is an automatic reset circuit which consists of transistors $Tr_8$, $Tr_9$, diodes $D_9$, $D_3$, $D_{11}$, $D_{12}$, a capacitor 343 and a plurality of resistors, and which acts so as to set the tape driving unit and the control circuit to the starting point for receiving the next call after the power is recovered from a failure. The last part is a time limiting circuit which consists of resistors 350, 351, 353, capacitors 352, 354, diodes $D_{21}$, $D_{22}$, $D_{23}$ and transistors $Tr_{13}$, $Tr_{14}$, $Tr_{15}$, $Tr_{16}$, and which acts so as to cut off the power for the control circuit when the automatic answering set continues one operation cycle thereof for more than 120 seconds. Such an operation is regarded as a failure of the mechanism or the circuit.

Other elements are as follows. A transistor $Tr_2$ acts so as to prevent the set from a malfunction and a group of a resistor 355, a capacity 339 and diodes $D_6$, $D_{14}$ acts so as to provide the circuit with some interval when the set is changed from the answering message to the caller's message. Diodes $D_{25}$ and $D_{26}$ are provided for supplying a power to the motor control circuit and the recording and reproducing amplifier. A diode $D_{29}$ and a capacitor 391 constitute a power circuit for the plunger $PL_2$ and diodes $D_{27}$, $D_{28}$ and capacitor 390 are for a power to other control circuit. $T_5$ is a power source transformer, 392 a fuse, 393 a power switch, a variable resistor fitted to the power switch, 394 a plug for receiving a power source. $S_1$ is the microswitch 245 which detects the operation end of the caller's message recording tape and stops the operation of the call detecting circuit after receiving of the twentieth call signal. $S_6$ is the leaf-switch 248 which detects the overriding of the magnetic head unit for the recording tape and cuts off the power source when the head unit exceeds the full scale. $S_2$ is the microswitch 280 which detects one rotation of the caller's message recording tape. $S_4$ is the microswitch 55 for detecting one rotation of the answering message tape. $L_1$ is an indicator for recording, $L_2$ an indicator for operating, and $L_3$ a power indicator. $a_1$ to $a_8$, $b_1$ to $b_7$, $c_1$ to $c_4$, $e_1$ to $e_8$ and $f_1$ to $f_2$ are contacts of the key switches for automatic answering operation, recording of conversation, reproducing of a caller's message, recording and reproducing of an answering message and connecting between the set and the office line respectively. $S_6$ is a contact of the leaf-switch 248 for changing the set to the exclusive use for the answering operation.

The operation of this embodiment will be described in detail hereunder. This embodiment is provided with a means for protecting the set from a failure as follows. The index 6 might be not correctly set to the initial scale 1, but to, for example between 1 and 2, when the set is prepared for the operation. In such a case, assuming that the circuit is not provided with the bent piece 225, microswitch 245 and leaf-switch 248 in FIG. 3 which correspond to the sensor $S_1$ and $S_6$ in FIGS. 35*a* to 35*d*, the recording time for a caller's message might be shorter than the regular period if the call is received when the magnetic head is advanced to a position corresponding to the midway between 19 and 20 of the dial after some preceding calls. In the worst case, the head might reach the end of the tape immediately after starting of the recording, with a result that the caller's message could not be all but recorded. Further, against the succeeding call, the answering message can be transmitted, but the caller's message cannot be recorded. This brings the caller not only a loss of the telephone fee, but another problem such that the caller takes it for granted that his message has been recorded and this misunderstand might develop to other important problem in future. For obviating the above defects, the present telephone set is arranged in such a manner that after the index is moved over the scale 19 the emitter and collector of the transistor $Tr_1$ are shortcircuited through the sensor $S_1$ or microswitch contact 245, thereby the call detecting circuit cannot produce its output, with a result that the succeeding call is not detected. Therefore, if the initial position of the index 6 is at the midway of the scale, the set will be stopped when the index 6 reaches a position between 19 and 20 of the scale and the succeeding call cannot operate the telephone set, thereby the above problem being avoided. Next, following problems should be taken into consideration in case of the reproduction. Assuming that the set is held at the state of reproduction for a long time, the magnetic head 219 might be moved to the most right end of the screw 233 in FIG. 3, the screw being kept at the state as be pressed against the plate 203, if the set is provided with no safety device. Consequently, the driving drum 26 cannot rotate and the motor is stopped as be supplied with an input current, which causes the motor to be overheated with a result of shortening the life. For obviating such a defect, the present set is arranged so as to cut off the power source by opening the contacts of the leaf-switch 248 when the index slightly exceeds the full scale 20.

The operation of the call detecting circuit is as follows. When the set is under the condition for receiving a call, the transistor $Tr_1$ is conductive with a bias current supplied through a resistor 334, thereby the capacitor 337 being discharged, the transistors $Tr_3$ and $Tr_4$ respectively being switched on and off, the input of the main control circuit being cut off, and the relay contacts $rl_{1-1}$ and $rl_{1-2}$ are changed to the state as shown in FIG. 35*a*. In this state, if a call signal is transmitted through the office line, the call signal is fed to the call detecting circuit through the transformer $T_1$. Then a rectangular negative wave formed by a rectifier circuit consisting of a diode $D_1$, capacitor 336 and resistor 335 is supplied to the base circuit of the transistor $Tr_1$. Thereby the transistor $Tr_1$ is switched off from on and the capacitor 336 is charged with a current supplied through a diode $D_2$ and resistor 395. Assuming that a call signal is a repetition of 16 ⅔ Hz waves, each having a duration of one second and an interval of 2 seconds, as waveform A shown in FIG. 36, such a signal causes the transistor $Tr_1$ to be off for one second, with the result that the capacitor 336 is charged for that time. After the above off time, the transistor $Tr_1$ is again switched on for two seconds, with a result that the capacitor 336 is discharged through the resistor 335. The input resistor of the Schmitt circuit is selected so as to have a resistance value higher than the resistors 395 and 335 for avoiding an affect of the above charging or discharging. The waveform D in FIG. 36 shows the charging and discharging wave of the capacitor produced by receiving a call signal. The potential of the capacitor gradually increases according to increasing of the number of the signal waves and reaches the threshold potential of the Schmitt circuit. The time for increasing the potential of the capacitor to the threshold voltage is determined by the resistors 395, 335 and the capacitor 336. Usually the time is adjusted to a value between 3 to 10 seconds. When the charging potential of the capacitor reaches the threshold voltage, the transistors $Tr_3$ and $Tr_4$ of the Schmitt circuit are respectively switched off and on, thereby the call detecting signal being supplied to the main control circuit with a result that the automatic answering operation is started. FIGS. 36A, 36B, 36C, 36D, 36E and 36F show waveforms of a call signal, negative rectangular wave signal supplied to the transistor $Tr_1$, output of the transistor $Tr_1$, charging and discharging potential of the capacitor 336, output of the transistor $Tr_3$ and output of the transistor $Tr_4$ respectively. As abovementioned, the call detecting circuit is electronically operated and simply structured, thereby its operation being very reliable and also stable. Moreover, the level detection is actuated by the Schmitt circuit, so that the detection can be reliably operated.

Next, a detailed description will be made for the track deviation protecting means. A wide magnetic tape such as be used in this set is scarcely used in a conventional device and the track deviation preventing means can be seen in no conventional device. The track deviation is derived from; (1) a slip between the tape driving drum and the wide tape (2) variation of the drum diameter or the tape length, and the like. The track deviation due to the above causes can be hardly avoided by conventional mechanism or structure. The device according to the invention is provided with the track deviation protecting means which acts as followings. When the elongated perforation 211 of the wide tape 22 is moved to the position to be engaged with the lever so that the microswitch contact $S_3$ is closed and the leaf-switch $S_5$ is also closed by the fan-shaped cam 400, the transistors $Tr_{11}$ and $Tr_{12}$ are respectively turned off and on, because the base circuit of the transistor $Tr_{11}$ is shunted by the microswitch $S_3$ and the base of the transistor $Tr_{12}$ is applied with a signal through the switch $S_5$, capacitor 348, resistor 349 and diode $D_{30}$. Hence, the coil $PL_1$ of the electromagnet 259 is deenergized so that the moving piece 260 of the electromagnet is attracted upwards by the spring 261 thereby to engage the gear 254 with the gear 216 of the driving drum. In this state, the rotation of the motor 68 is transmitted to the screw 233 through the drum 26, gears 216, 254, 257 and 258 so that the head is moved towards the right hand in FIG. 3 according to the tape running. The elongated perforation 211 and fan-shaped cam are also moved and come to the position where the switches $S_3$ and $S_5$ are closed. But the flip-flop consisting of the transistors $Tr_{11}$ and $Tr_{12}$ is not triggered. When the head is further moved and the fan-shaped cam 285 is turned by one rotation and returned to the position as shown in FIG. 25, the switch $S_5$ is closed and a charging current flows through the capacitor 348, by which the flip-flop is triggered and the transistors $Tr_{11}$ and $Tr_{12}$ are respectively turned on and off. Hence, the coil $PL_1$ of the electromagnet 259 is energized and the movable piece 260 is attracted by the magnet force thereby to disengage the gear 254 with the gear 216 as shown in FIG. 25. Thus the rotation of the driving drum is not transmitted to the screw 233. In this state, the wide tape is driven and the elongated perforation 211 is again faced to the leaf-switch 285 so that the switch $S_3$ is closed and the electromagnet is energized. As above-mentioned, the starting position of the magnetic head is exactly controlled by means of the track deviation preventing circuit. Therefore the magnetic head exactly follows the recording track in the reproducing operation.

The motor control circuit acts so as to reverse the motor rotation when the operation is changed from the answering tape to the caller's message tape or vice versa, and consists of a saturation type flip-flop, a double stage series connection type switching circuit which is connected in cascade with the flip-flop, and a motor which is connected across the two connecting points between the flip-flop and the switching circuit as shown in FIG. 35C. When the answering message signal is transmitted to the office line, the transistors $Tr_{24}$ and $Tr_{23}$ are conductive by conduction of the transistor $Tr_{10}$, which causes the transistors $Tr_{25}$ and $Tr_{22}$ to be off. Hence, the connecting point between the transistors $Tr_{22}$ and $Tr_{24}$ is at a negative potential compared with the connecting point between the transistors $Tr_{23}$ and $Tr_{25}$, which causes the motor to be driven in the direction such that the answering tape is correctly driven. When the caller's message tape is driven, the above transistors are changed to the opposite state from the above state and the motor is driven in the opposite direction.

When the set is arranged for the exclusive use for the answering operation, the knob 3 is turned to the position 3 in FIG. 1, which corresponds to the third track, thereby the contact $S_7$ of the microswitch 87 is changed. In this state, a call signal is detected by the call detecting circuit, an output of which causes the relay $RL_1$, the motor 385, the plunger coil $PL_2$ and the recording and reproducing amplifier to be actuated, with a result that the answering message is transmitted to the office line. Then the answering message tape is driven by one rotation, which is detected by the microswitch 55 and the contact $S_4$ is closed, thereby the cathode of the diode $D_{13}$ being connected to the ground potential through the contacts $S_6$ and $S_4$, which in turn causes the transistor $Tr_5$ to be cut off. As the result, the timing circuit, motor control circuit, and the relay $RL_2$ are deenergized by means of the transistor $Tr_{26}$, thereby the office line being opened and the set being prepared for a succeeding call.

Operation of the set:

The automatic answering telephone set according to the present invention can be operated so as to record a normal conversation by the telephone, and to record and reproduce the caller's message with a simple handling.

Automatic answering and recording

The key 11 is pushed, thereby the changing switch $a_1$ to $a_8$ being respectively changed to the positions and the set is arranged for receiving a call. In this state, a call signal is transmitted to the call detecting circuit through the changing over switch $f_1$, changing switch $a_1$, relay contact $rl_{2-1}$, capacitor 331, resistor 332, coupling transformer $T_1$, changing over switch $f_2$, $rl_{relay}$ $rl_{1-2}$. As abovementioned, the detecting circuit operates as followings in three to ten seconds after receiving the call signal. The relay contacts $rl_{2-1}$ and $rl_{l2-2}$ are changed over by means of the relay coil $RL_2$ being actuated by the transistor $Tr_{10}$ through the diode $D_{16}$, thereby the plunger coil $PL_2$ being energized, while the relay contacts $rl_{1-1}$ and $rl_{1-2}$ are changed over by means of the relay coil $RL_1$ being actuated through the diode $D_{10}$, by the transistor $Tr_7$ which is in turn actuated by the transistors $Tr_5$ and $Tr_{26}$, thereby the office line being kept in connection through the key contact $a_2$ and resistor 330. Simultaneously, the motor control circuit and the recording and reproducing amplifier being supplied with a power source through the relay contact $rl_{2-1}$ and diode $D_{26}$, with a result that the answering tape is driven. Succeedingly the answering message is reproduced by means of the magnetic head 388 as the result of the contact $S_4$ of the microswitch 55 being opened, the transistor $Tr_5$ being held at conduction by means of the resistor 344 and diode $D_5$ and the transistor $Tr_{10}$ being held at conduction by means of the relay contacts $rl_{2-1}$ and diode $D_{15}$, while the reproduced message signal is transmitted to the office line though the relay contact $rl_{4-6}$, resistor 365, key contact $a_7$, relay contacts $rl_{1-1}$, and $rl_{1-2}$, transformer $T_1$, capacitor 333, relay contact $rl_{1-1}$, key contact $a_1$ and changing switch. When the message is completely transmitted to the office line and the answering message tape is returned to the initial position by its one rotation, the contact of the microswitch 55 i.e., $S_4$ is closed, thereby the transistor $Tr_{10}$ being off, but the transistor $Tr_5$ being held at conduction by means of the capacitor 339 which is charged through the changing switch contact $S_6$, key contact $a_4$ and diode $D_{14}$ during the transmission of the message, substituted to means of the bias current supplied through the diode $D_5$. Consequently, the relay $RL_2$ and plunger coil $PL_2$ are deenergized, the changing relay $RL_4$ and the bias signal producing circuit being energized through the transistor $Tr_{26}$, key contact $e_2$ and relay contact $rl_{2-1}$, the motor control circuit and the recording, reproducing amplifier being supplied with the power source through the diode $D_{25}$. As the result of the above operation, the peep tone circuit is actuated so as to transmit a peep tone signal to the office line, whereby the caller is informed that the telephone set is arranged for recording his message. Simultaneously, the peep tone signal is supplied to the magnetic head for recording and reproducing the caller's message 386 for a moment through the relay contact $rl_{4-1}$, resistor 363, microphone jack $J_1$, relay contact $rl_{4-2}$, amplifier circuit, relay contact $rl_{4-5}$, resistor 377, relay contact $rl_{3-2}$, resistor 379, capacitor 378, as the result of driving of the caller's message tape and actuation of the relay $RL_4$. The caller's message is recorded on the tape according to the operation of the bias signal generating circuit. In the tape driving mechanism, the caller's message recording tape is driven by deenergizing of the electromagnet 66. When the contact $S_3$ of the microswitch 286 is closed by the elongated perforation on the wide tape, the electromagnet is deenergized so that the fan-shaped cam 400 is rotated by the gear 254 and the actuator 281 of the microswitch 280, i.e., the contact $S_2$, is disengaged with the concave cam face 272 thereby to change over the switch $S_2$, while the leaf-switch 282, i.e., the contact $S_5$, and the microswitch 55, i.e., contact $S_4$, are closed and the capacitor 339 is charged through the diode $D_{14}$ during the answering operation. Therefore the transistor $Tr_5$ is maintained at the conductive state even if the input signal through the diode $D_5$ is cut off, and thereby the control circuit is supplied with a power current through the transistor $Tr_{26}$. When the microswitch $S_3$ is actuated according to the rotation of the fan-shaped cam 400, the transistor $Tr_5$ is again supplied with its input current through the diode $D_5$. When the microswitch $S_2$ is again changed over from the above state, the charge of the capacitor 339 is completely discharged through the resistor 335, switches $S_3$, $S_5$ and $S_4$ during the recording operation. After five rotations of the tape, the actuator 281 is again engaged with the concave cam face 272 and the switch $S_2$ is actuated. In this case, the transistors $Tr_5$ and $Tr_{26}$ are immediately turned off due to no charge of the capacitor 339 and thereby the power supply to the control circuit is cut off and the motor is stopped, while the transistor $Tr_7$ is held at the conductive state by the discharging current of the capacitor $C_{341}$. Hence the relay $RL_1$ is energized for a moment so that the office line is connected during the transmission of the peep tone signal. In the above operation, when the key 11 for the automatic answering operation is pushed after the reproducing or conversation recording operation, the fan-shaped cam 400 is not always located at the position where the leaf-switch $S_5$ is closed. If the disc 270 and the disc plate 401 constitute an ordinary clutch, the relative position between the fan-shaped cam 400 and the timer cam plate 272 is indefinite so that the switches $S_5$ and $S_2$ might be simultaneously actuated and thereby the base current of the transistor $Tr_5$ through the diode $D_5$ might be shunted by the circuit through the diode $D_{13}$, switches $S_2$, $S_5$ and $S_4$. Hence the transistor $Tr_5$ is maintained at the conductive state so that the wide tape 22 is driven over the whole way of the recording track without a stop each recording. In the present invention, the relative position between the disc 270 and the disc plate 401 is determined by the pin 403 and the holes 402. As a result, even if the switch $S_5$ is not closed by the fan-shaped cam 400 when the key 11 is pushed, the pin 403 is always engaged with one of the holes 402 before the fan-shaped cam is turned by one rotation. Moreover, as the timer cam plate 272 is not rotated before the engagement, the base current of the transistor $Tr_5$ is always shunted by the circuit including the switches $S_5$ and $S_4$ during one rotation of the cam. Hence the transistor $Tr_5$ is turned off and the wide tape is stopped after at most one rotation of the same, then being held at the state for waiting a call. Further, when the power is supplied by means of the key 11, the transistor $Tr_8$ is immediately turned on by the charging current of the capacitor 343 while the transistor $Tr_7$ is held at the off state. Hence the relay $RL_1$ is not energized and the call signal cannot be received by the set before the pin 403 and the hole are engaged thereby to set the system to receive the call.

Conversation recording

In the case of recording a normal conversation by telephone, the set is arranged by pushing the key 10 in state of talking. Thereby the transistor $Tr_5$ is biased through the key contact $b_2$, which in turn causes the transistor $Tr_{26}$ to be conductive, with a result that the relay $RL_1$ is energized through the diode $D_{10}$ and key contact $b_3$ and power is supplied to the relay $RL_4$, the motor control circuit, the bias signal producing circuit and the recording, reproducing amplifier. Hence the above circuit is actuated and the conversation signal is transmitted to the amplifier through the capacitor 333, transformer $T_1$, relay contacts $rl_{1-2}$, $rl_{4-1}$, resistor 363, microphone jack $J_1$ and relay contact $rl_{4-3}$. Amplified signal is transmitted to and recorded on the caller's message recording tape through the relay contact $rl_{4-5}$, resistor 377, relay contact $rl_{3-2}$, resistor 379 and capacitor 378.

Reproducing

The reproducing operation includes a reproducing of the caller's message recorded by the automatic answering operation and a reproducing of the conversation recorded in the normal talking by telephone. By pushing the key 9, the relay $RL_3$ is actuated through the key contact $c_1$ and the motor control circuit and the recording and reproducing amplifier are actuated through the relay contact $c_1$, with a result that the signal recorded on the caller's message tape is led to the amplifier through the head 386, and relay contacts $rl_{3-1}$ and $rl_{4-2}$ and the amplified signal is led to the earphone or the speaker for reproducing through the relay contact $rl_{4-6}$, key contacts $e_8$ and $c_3$.

Recording of the answering message

By inserting the microphone into the microphone jack $J_1$, setting the knob 3 to a desired track, and pushing the key 7, the switch contact $S_7$, and the key contacts $e_4$ and $e_5$ are closed, thereby the relays $RL_3$ and $RL_4$ being actuated, with a result that the bias signal producing circuit, the motor control circuit and the amplifier are actuated by power supplied through the diode 25. Consequently the voice signal produced by the microphone is transmitted to the amplifier through the relay contacts $rl_{4-2}$ and the amplified voice signal is supplied to the answering message magnetic head for recording through the relay contact $rl_{4-5}$, resistor 377, relay contact $rl_{3-2}$, resistor 381 and capacitor 380, while the transistor $Tr_{10}$ and the relay $RL_2$ are actuated by means of the key contact $e_3$, capacitor 345, resistor 346 and the diode $D_{18}$, thereby the plunger coil $PL_2$ being energized, with a result that the tape driving mechanism is changed to the state for recording the answering message. During the recording, the transistor $Tr_{10}$ is held at conduction by means of the key contact $e_2$, relay contact $rl_{2-1}$ and diode $D_{15}$. When the recording of the answering message is completed and the tape is returned to the starting position by its one rotation, the rotation is detected by the detecting microswitch and the transistor $Tr_{10}$ is switched off by closing of the contact of the detecting microswitch. This is a cycle of the answering message recording.

Reproducing of the answering message

By removing the microphone from the jack $J_1$, and pushing the key 7, the transistor is actuated by power through the key contact $e_3$, resistor 346, capacitor 345 and diode $D_{18}$ and simultaneously held at the state by the circuit including the relay contact $rl_{2-1}$, while the tape driving mechanism is changed to the position for the answering operation by means of the plunger $PL_2$ and the motor control circuit and the amplifier are actuated by power through the key contact $e_2$, relay contact $rl_{2-1}$ and the diode $D_{26}$, thereby the reproducing signal from the head 388 being amplified by the amplifier and the amplified signal being transmitted to the earphone or the speaker for sounding. When the answering tape is driven by one rotation, the transistor $Tr_{10}$ is switched off by means of the contact $S_4$ and the set is returned to the starting position. Other tracks are recorded or reproduced by the same manner.

What is claimed is:

1. An automatic answering telephone set, comprising, in combination:
   - an endless answering tape recorded with an answering message for transmission to a caller upon detection by said telephone set of a call signal;
   - an endless recording tape having a plurality of tracks across the width thereof for recording a caller's message;
   - a driving roller and at least one guide roller, said recording tape being supported on and tensioned by said driving and guide rollers;
   - two coaxial capstans for driving said answering and recording tapes, respectively;
   - driving source means for driving said capstans;
   - selecting means for selectively moving said capstans into driving engagement with one of said answering and recording tapes;
   - screw means engaging said driving roller;
   - magnetic head means engaging said screw means and movable transversely across the width of said recording tape according to the rotation of said screw means;
   - switch means for controlling the amount of recording tape available for recording a caller's message;
   - cam means for actuating said switch means;
   - normally disengaged clutch means for engaging said cam means with said screw means when said clutch means is engaged; and
   - means for engaging said clutch means when said set is in a receiving mode for receiving a message from a caller.

2. An automatic answering telephone set, comprising in combination:
   - an endless answering tape recorded with an answering message for transmission to a caller upon detection by said telephone set of a call signal;
   - an endless recording tape having a plurality of tracks across the width thereof for recording a caller's message;
   - a driving roller and at least one guide roller, said recording tape being supported on and tensioned by said driving and guide rollers;
   - two coaxial capstans for driving said answering and recording tapes, respectively;
   - driving source means for driving said capstans;
   - selecting means for selectively moving said capstans into driving engagement with one of said answering and recording tapes;
   - screw means engaging said driving roller;
   - magnetic head means engaging said screw means and movable transversely across the width of said recording tape according to the rotation of said screw means;
   - waveform shaping means for converting a call signal transmitted to said telephone set into a rectangular pulse signal;
   - charging and discharging circuit means charged with said rectangular pulse signal and discharged when the charge potential reaches a predetermined potential level; and
   - a Schmitt circuit triggered by an output signal of said charging and discharge circuit means, wherein the answering operation of said telephone set is started by an output signal from said Schmitt circuit.

3. An automatic answering telephone set, comprising, in combination:
   - an endless answering tape recorded with an answering message for transmission to a caller upon detection by said telephone set of a call signal;
   - an endless recording tape having a plurality of tracks across the width thereof for recording a caller's message;
   - a driving roller and at least one guide roller, said recording tape being supported on and tensioned by said driving and guide rollers;
   - two coaxial capstans for driving said answering and recording tapes, respectively;
   - driving source means for driving said capstans;
   - selecting means for selectively moving said capstans into driving engagement with one of said answering and recording tapes;
   - screw means engaging said driving roller;
   - magnetic head means engaging said screw means and movable transversely across the width of said recording tape according to the rotation of said screw means;
   - a bistable multivibrator including two transistors;
   - first and second transistors connected with the output terminals of said two transistors, respectively, an output terminal of said first transistor being connected in series with an input terminal of said second transistor;

said driving source being connected across the output terminals of said two transistors comprising said bistable multivibrator, the direction of rotation of said driving source being controlled by said first transistor.

4. An automatic answering telephone set, comprising in combination:

an endless answering tape recorded with an answering message for transmission to a caller upon detection by said telephone set of a call signal;

an endless recording tape having a plurality of tracks across the width thereof for recording a caller's message;

a driving roller and at least one guide roller, said recording tape being supported on and tensioned by said driving and guide rollers;

two coaxial capstans for driving said answering and recording tapes, respectively;

driving source means for driving said capstans;

selecting means for selectively moving said capstans into driving engagement with one of said answering and recording tapes;

screw means engaging said driving roller;

magnetic head means engaging said screw means and movable transversely across the width of said recording tape according to the rotation of said screw means;

detecting means for detecting the movement of said magnetic head means into an end position adjacent one end portion of said recording tape; and cut-off means engaging said detecting means for cutting off power to said driving source means in response to the detection of said end position by said detecting means.

5. An automatic answering telephone set according to claim 4, wherein:

said detecting means includes a member integrally fixed on said magnetic head means; and said cut-off means includes switch means actuated by said member when said magnetic head means is in said end position.

6. An automatic answering telephone set, comprising, in combination:

an endless answering tape recorded with an answering message for transmission to a caller upon detection by said telephone set of a call signal;

an endless recording tape having a plurality of tracks across the width thereof for recording a caller's message;

a driving roller and at least one guide roller, said recording tape being supported on and tensioned by said driving and guide rollers;

two coaxial capstans for driving said answering and recording tapes, respectively, said capstans having different diameters;

driving source means for driving said capstans;

selecting means for selectively moving said capstans into driving engagement with one of said answering and recording tapes;

screw means engaging said driving roller; and magnetic head means engaging said screw means and movable transversely across the width of said recording tape according to the rotation of said screw means.

7. An automatic answering telephone set according to claim 6, comprising a sliding shaft in parallel to said screw means, a supporting member being slidably mounted on said sliding shaft, and a pawl that is rotatably supported on said supporting member and is normally engaged with a grooved provided on said screw means by a spring force, wherein said magnetic head means becomes free to be moved transversely across the width of said recording tape when said pawl is disengaged with said groove by turning of the same against said spring force.

8. An automatic answering telephone set according to claim 6, comprising a main body, a common base plate which is removably fitted to said main body, a head arm to mount said magnetic head means so as to be contacted with said recording magnetic tape by a spring force, and said head arm and said capstans being mounted on said main body, said driving roller and guide roller for supporting said recording tape being mounted on said common base.

9. An automatic answering telephone set according to claim 6, comprising a conversation recording circuit which is connected with an office line and arranged for its operation by means of holding up of a receiver and a key operation, a conversation reproducing circuit which is arranged for its operation by means of a key operation, an answering message recording circuit which is arranged for its operation by means of a key operation and a connection between a microphone plug and a microphone jack, and an answering message reproducing circuit which is arranged for its operation by means of a key operation and a disconnection between said microphone plug and said microphone jack.

10. An automatic answering telephone set according to claim 6, comprising a protecting means for preventing said set from taking a step of responding to said call signal and recording a caller's message when the remaining capacity of said recording tape is less than the capacity for recording one caller's message.

11. An automatic answering telephone set according to claim 10, comprising a first switch having an actuator, and a cal detecting circuit for detecting said call signal transmitted through an office line, said call detecting circuit being isolated from said automatic answering operation by means of said actuator pressed by a pushing member integrally mounted on said magnetic head means which is faced to the remaining portion of said recording tape.

12. An automatic answering telephone set according to claim 6, comprising an opening provided on said answering tape, a guide pin which is provided with a first groove having almost the same width as the width of said answering tape, and with a second groove having a width narrower than the width of said answering tape at the center portion of said first groove, a lever which is engaged with said second groove when said answering tape is moved to a position where said opening is opposite to said second groove and a switch which is controlled by the operation of said lever, said switch being arranged so as to detect that said answering tape is moved by a predetermined rotation and to stop the driving of said answering tape.

13. An automatic answering telephone set according to claim 12, wherein said answering tape is contained in a cartridge having a pinch roller and an opening for receiving said lever and said magnetic head means when said cartridge is removably fitted into said telephone set.

14. An automatic answering telephone set according to claim 6, comprising three recording tracks provided on said answering tape which are recorded with respective different answering messages, a member supporting said magnetic head means and being movable in an axial direction, and a cam having a plurality of cam faces which have the respective face levels different from each other, the end of said supporting member being urged to be abutted to one of said cam faces by a spring, said magnetic head means being moved transversely across the driving direction of said answering tape thereby to be opposite to one of said tracks which is determined according to said cam face to be engaged with said end of said supporting member.

15. An automatic answering telephone set according to claim 14, in which at least one of said tracks is recorded with a message for informing the caller of no caller's message recording and switch for preventing said set from recording of the caller's message is interlocked with the rotation of said cam when said magnetic head means is opposite to said one track.

16. An automatic answering telephone set according to claim 6, in which a member commonly supporting said two capstans is fixed to a capstan arm which is turnable in both directions and forced in one direction by a spring force, a plunger of an electromagnet being connected with said capstan arm, and said capstan for the recording tape contacts to the end portion of said driving roller in accordance with the turning of said capstan arm by said spring force when said electromagnet is de-energized, and said capstan for the answering tape contacts a pinch roller against said spring force by means of said plunger when said electromagnet is energized.

17. An automatic answering telephone set according to claim 16, wherein said set includes a rocking lever and at least three keys for the automatic answering, the caller's message reproducing and the conversation recording respectively, said rocking lever being moved downwards so that the turning of said capstan arm is not restricted by said rocking lever when anyone of said keys is pushed, said rocking lever being moved upwards so that the turning of said capstan arm by a spring force is restricted thereby to prevent said capstan for the wide tape from contacting with said driving roller when none of said keys is pushed.

18. An automatic answering telephone set according to claim 6, comprising a means to stop the driving of said answering tape after one rotation thereof and a means to lock a lock release lever so that the automatic answering operation is not changed to other operation during said operation.

19. An automatic answering telephone set according to claim 18, comprising an electromagnet for moving a capstan, a slide lever provided with a notch to be normally engaged with a projection of said lock release lever, said slide lever being moved by an actuation of said electromagnet, and said slide lever being moved to a position where said projection cannot be engaged with said notch when said capstan contacts with a pinch roller.

20. An automatic answering telephone set according to claim 6, further comprising a rotor engagable with said driving roller, wherein said screw means engage said driving roller through said rotor.

21. An automatic answering telephone set according to claim 20, comprising a first detecting means that produces a detecting signal each one rotation of said recording tape, a second detecting means that produces a control signal when said rotor is turned by a predetermined rotation which rotates said screw means through one revolution and a means by which said driving roller and said rotor are engaged according to said detecting signal and disengaged according to said control signal.

22. An automatic answering telephone set according to claim 21, in which said recording tape is provided with an opening and said first detecting means includes a first switch having an operating lever, said switch being normally opened, and said detecting signal being produced according to the closing of said switch when said operating lever is inserted into said opening.

23. An automatic answering telephone set according to claim 21, in which said rotor is mounted on a rocking arm which is normally forced by a spring force so as to make said rotor engaged with said driving roller, but is moved against said spring force by energizing of an electromagnet and the engagement between said rotor and said driving roller is controlled by said electromagnet which is energized according to said detecting signal and de-energized according to said control signal.

24. An automatic answering telephone set according to claim 21, in which said screw means in provided with a fan-shaped cam at one end portion thereof and said second detecting means comprises a second switch, said control signal being produced when aid second switch is actuated by means of said fan-shaped cam.

25. An automatic answering telephone set according to claim 24, wherein said telephone set includes a clutch mechanism comprising a transmitting member and a receiving member, a projection which is provided on one of said members, a concave portion engaged with said projection is provided on the other of said members, projection being engaged with said portion for actuating said clutch mechanism when said second switch is actuated by said fan-shaped cam which is moved by the rotation of said screw, the telephone set being arranged to operate the automatic answering operation after said clutch mechanism is actuated.

* * * * *